US012690625B2

(12) United States Patent
Fujita

(10) Patent No.: US 12,690,625 B2
(45) **Date of Patent: *Jul. 28, 2026**

(54) INDUCTIVE HEATING APPARATUS, CONTROL UNIT THEREOF, AND OPERATION METHOD THEREOF

(71) Applicant: Japan Tobacco Inc., Tokyo (JP)

(72) Inventor: Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/796,312

(22) Filed: Aug. 7, 2024

(65) Prior Publication Data

US 2024/0389675 A1 Nov. 28, 2024

Related U.S. Application Data

(63) Continuation of application No. 18/473,300, filed on Sep. 25, 2023, now Pat. No. 12,089,657, which is a continuation of application No. 18/070,596, filed on Nov. 29, 2022, now Pat. No. 11,918,052, which is a (Continued)

(30) Foreign Application Priority Data

Mar. 31, 2021 (JP) ............................ JP2021-059578

(51) Int. Cl.

| | |
|---|---|
| ***A24F 13/00*** | (2006.01) |
| ***A24F 40/20*** | (2020.01) |
| ***A24F 40/465*** | (2020.01) |
| ***A24F 40/51*** | (2020.01) |
| ***A24F 40/57*** | (2020.01) |
| ***H05B 6/06*** | (2006.01) |
| ***H05B 6/10*** | (2006.01) |

(52) U.S. Cl.

CPC .............. *A24F 40/57* (2020.01); *A24F 40/20* (2020.01); *A24F 40/465* (2020.01); *A24F 40/51* (2020.01); *H05B 6/06* (2013.01); *H05B 6/105* (2013.01)

(58) Field of Classification Search

CPC ........................................................ A24F 47/00
USPC .................................................. 131/328–329
See application file for complete search history.

(56) References Cited

U.S. PATENT DOCUMENTS

| | | | |
|---|---|---|---|
| 7,761,017 | B2 | 7/2010 | Yashiro |
| 7,965,090 | B2 | 6/2011 | Kwak |
| 10,028,533 | B2 | 7/2018 | Fursa et al. |

(Continued)

FOREIGN PATENT DOCUMENTS

| | | | |
|---|---|---|---|
| CN | 1991273 | A | 7/2007 |
| CN | 2023-382427 | U | 8/2012 |

(Continued)

OTHER PUBLICATIONS

Japanese Office Action issued Jan. 27, 2025 in corresponding Japanese Patent Application No. 2023-132929, 12 pages.

(Continued)

*Primary Examiner* — Phuong K Dinh
(74) *Attorney, Agent, or Firm* — XSENSUS LLP

(57) ABSTRACT

A control unit for an inductive heating apparatus configured to inductively heat a susceptor of an aerosol forming body includes the susceptor and an aerosol source, the control unit is configured to in a case where the susceptor ceases to be detected while the inductive heating is being executed, stop the inductive heating or notifying an error.

21 Claims, 24 Drawing Sheets

Related U.S. Application Data continuation of application No. PCT/JP2022/015254, filed on Mar. 29, 2022.

(56) References Cited

U.S. PATENT DOCUMENTS

| | | | |
|---|---|---|---|
| 10,051,890 B2 | 8/2018 | Mironov et al. | |
| 10,477,894 B2 | 11/2019 | Mironov | |
| 10,674,763 B2 | 6/2020 | Zinovik et al. | |
| 10,945,466 B2 | 3/2021 | Mironov et al. | |
| 10,952,469 B2 | 3/2021 | Mironov | |
| 11,206,871 B2 | 12/2021 | Marubashi | |
| 11,212,881 B2 | 12/2021 | Fursa et al. | |
| 11,235,109 B2 | 2/2022 | Thorsen et al. | |
| 11,240,884 B2 | 2/2022 | Butin et al. | |
| 11,483,902 B2 | 10/2022 | Zinovik et al. | |
| 11,765,795 B2 | 9/2023 | Abi Aoun et al. | |
| 11,918,052 B2 | 3/2024 | Fujita | |
| 12,089,657 B2 * | 9/2024 | Fujita | A24F 40/51 |
| 2008/0138099 A1 | 6/2008 | Yashiro | |
| 2009/0009187 A1 | 1/2009 | Kwak | |
| 2016/0150825 A1 | 6/2016 | Mironov et al. | |
| 2017/0055585 A1 | 3/2017 | Fursa et al. | |
| 2017/0055587 A1 | 3/2017 | Zinovik et al. | |
| 2017/0064996 A1 | 3/2017 | Mironov | |
| 2017/0172208 A1 | 6/2017 | Mironov | |
| 2018/0242644 A1 | 8/2018 | Bessant et al. | |
| 2018/0317554 A1 | 11/2018 | Kaufman et al. | |
| 2019/0008210 A1 | 1/2019 | Mironov et al. | |
| 2019/0166918 A1 | 6/2019 | Thorsen et al. | |
| 2020/0037402 A1 | 1/2020 | Abi Aoun et al. | |
| 2020/0037664 A1 | 2/2020 | Fursa et al. | |
| 2020/0077715 A1 | 3/2020 | Mironov | |
| 2020/0297031 A1 | 9/2020 | Zinovik et al. | |
| 2020/0358300 A1 | 11/2020 | Akao et al. | |
| 2020/0375260 A1 | 12/2020 | Mizuguchi et al. | |
| 2021/0007393 A1 | 1/2021 | Jung et al. | |
| 2021/0120881 A1 | 4/2021 | Marubashi | |
| 2021/0145059 A1 | 5/2021 | Mironov et al. | |
| 2021/0145071 A1 | 5/2021 | Butin et al. | |
| 2021/0186114 A1 * | 6/2021 | Lee | A24F 40/57 |
| 2021/0204587 A1 | 7/2021 | Mironov | |
| 2022/0125125 A1 | 4/2022 | Sayed et al. | |
| 2023/0346025 A1 | 11/2023 | Jeong et al. | |

FOREIGN PATENT DOCUMENTS

| | | | |
|---|---|---|---|
| CN | 104420527 | A | 3/2015 |
| CN | 109890233 | A | 6/2019 |
| CN | 110476478 | A | 11/2019 |
| CN | 110731125 | A | 1/2020 |
| CN | 111511233 | A | 8/2020 |
| CN | 111669982 | A | 9/2020 |
| CN | 211910541 | U | 11/2020 |
| EP | 3871534 | A1 | 9/2021 |
| JP | 9-117155 | A | 5/1997 |
| JP | 2008-148460 | A | 6/2008 |
| JP | 2014524313 | A | 9/2014 |
| JP | 2016-524777 | A | 8/2016 |
| JP | 6077145 | B2 | 2/2017 |
| JP | 2017-516269 | A | 6/2017 |
| JP | 2017-532011 | A | 11/2017 |
| JP | 2019-528710 | A | 10/2019 |
| JP | 2019-531049 | A | 10/2019 |
| JP | 2019-535283 | A | 12/2019 |
| JP | 6623175 | B2 | 12/2019 |
| JP | 6653260 | B2 | 2/2020 |
| JP | 6667709 | B1 | 3/2020 |
| JP | 6667710 | B1 | 3/2020 |
| JP | 2020-526181 | A | 8/2020 |
| JP | 2020-171253 | A | 10/2020 |
| JP | 2020-536575 | A | 12/2020 |
| KR | 89-0003055 | B1 | 8/1989 |
| KR | 10-2009-0002756 | A | 1/2009 |
| KR | 10-1000401 | B1 | 12/2010 |
| KR | 2011-0002521 | U | 3/2011 |
| KR | 2015-0045448 | A | 4/2015 |
| KR | 2020-0009993 | A | 1/2020 |
| KR | 2020-0061071 | A | 6/2020 |
| RU | 2744928 | C1 | 3/2021 |
| WO | 2014/029880 | A2 | 2/2014 |
| WO | 2015/177255 | A1 | 11/2015 |
| WO | 2015/177256 | A1 | 11/2015 |
| WO | 2015/177257 | A1 | 11/2015 |
| WO | 2016/030661 | A1 | 3/2016 |
| WO | 2018/019786 | A1 | 2/2018 |
| WO | 2018/050701 | A1 | 3/2018 |
| WO | 2018/096000 | A1 | 5/2018 |
| WO | 2019/030366 | A1 | 2/2019 |
| WO | 2019244323 | A1 | 12/2019 |
| WO | 2020/043901 | A1 | 3/2020 |
| WO | 2020/084757 | A1 | 4/2020 |
| WO | 2020/182749 | A1 | 9/2020 |
| WO | 2020/208868 | A1 | 10/2020 |
| WO | 2020/222530 | A1 | 11/2020 |
| WO | 2021/037403 | A1 | 3/2021 |
| WO | 2023285292 | A1 | 1/2023 |

OTHER PUBLICATIONS

European Communication pursuant to Article 94(3) EPC issued May 23, 2025 in corresponding European Patent Application No. 22780843.3, 4 pages.

International Search Report and Written Opinion mailed on Jun. 21, 2022, received for PCT Application PCT/JP2022/015249, filed on Mar. 29, 2022, 8 pages.

International Search Report and Written Opinion mailed on Jun. 21, 2022, received for PCT Application PCT/JP2022/015254, filed on Mar. 29, 2022, 8 pages.

Korean Office Action dated Feb. 1, 2023, issued in counterpart Korean Patent Application No. 10-2022-7039464, 11pp.

Japanese Office Action issued Mar. 27, 2023, in related Japanese Patent Application No. 2021-179952, 7pp.

Japanese Office Action issued Mar. 27, 2023, in related Japanese Patent Application No. 2023-012090, 10pp.

Taiwanese Office Action issued Aug. 10, 2023, in related Taiwanese Patent Application No. 111112580, 17 pages including English Translation.

Chinese Office Action issued Jun. 17, 2024 in corresponding Chinese Patent Application No. 202280004755.1, 12 pages.

Office Action issued on Nov. 27, 2023, in corresponding Chinese patent Application No. 202280004755.1, 12 pages.

Office Action issued Aug. 25, 2023 in Chinese Patent Application No. 202280004756.6, 38 pages.

Office Action issued on Aug. 28, 2025, in corresponding Korean patent Application No. 10-2023-7022699, 21 pages.

Japanese Office Action issued Sep. 27, 2024 in corresponding Japanese Patent Application No. 2023-132929, 10 pages.

Eurasian Search Report issued Jul. 31, 2024 in corresponding Eurasian Patent Application No. 202490588, 6 pages.

Search Report issued Dec. 11, 2024 in corresponding Great Britain Application No. 2416409.7, 1 page.

* cited by examiner

HEAT MODE MAIN PROCESSING 1200

FIG. 16
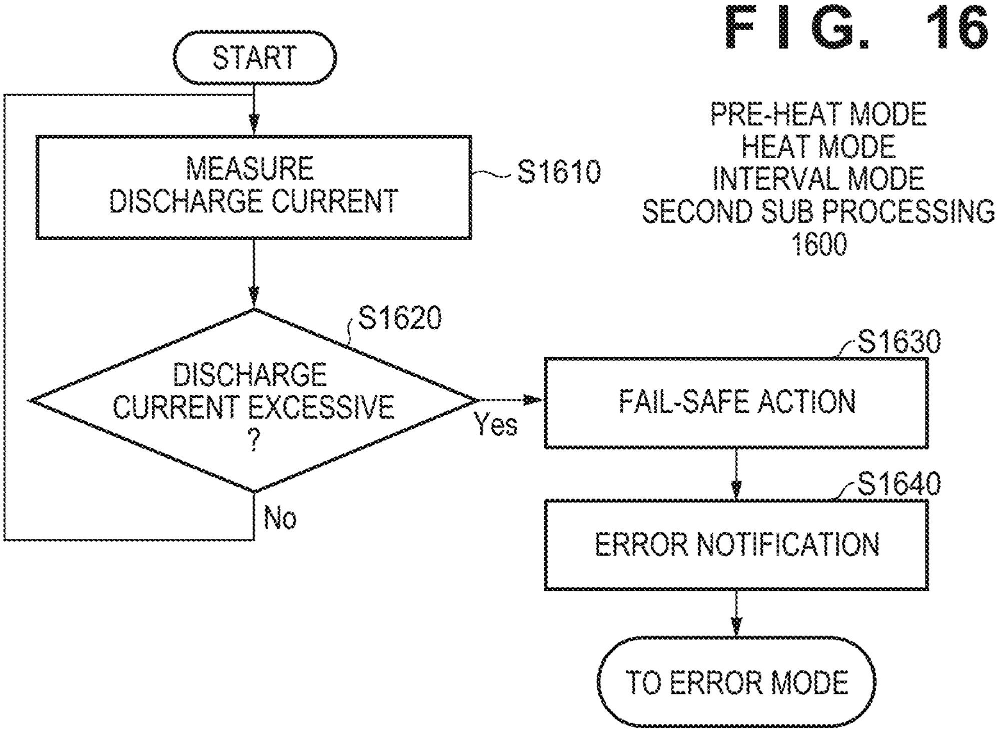
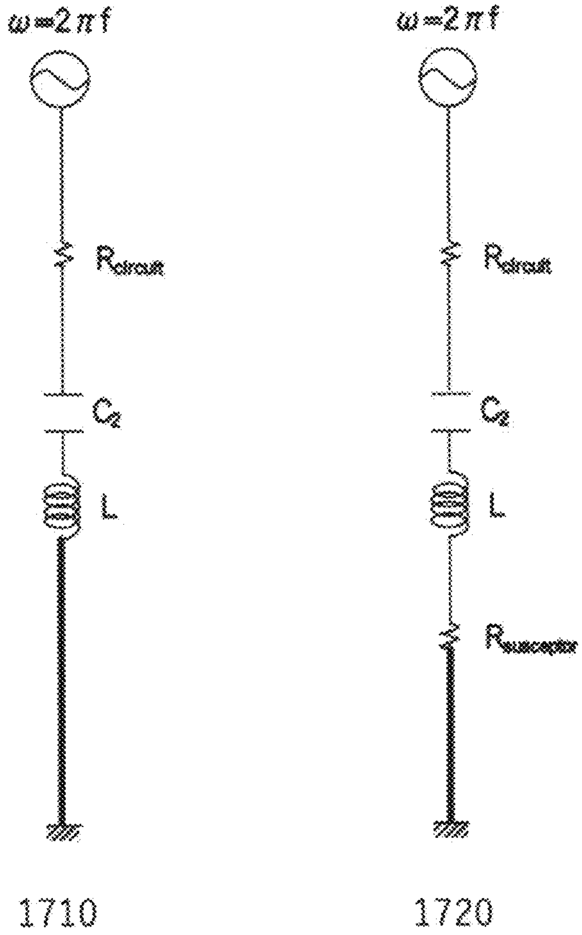
FIG. 17

1810

1820

INDUCTIVE HEATING APPARATUS, CONTROL UNIT THEREOF, AND OPERATION METHOD THEREOF

CROSS-REFERENCE TO RELATED APPLICATIONS

This application is a continuation of U.S. application Ser. No. 18/473,300, filed on Sep. 25, 2023, which is a continuation of U.S. patent application Ser. No. 18/070,596 filed on Nov. 29, 2022 (now U.S. Pat. No. 11,918,052), which is a continuation of International Patent Application No. PCT/JP2022/015254 filed on Mar. 29, 2022, which claims priority to and the benefit of Japanese Patent Application No. 2021-059578 filed on Mar. 31, 2021, the entire disclosures of each are incorporated herein by reference. This application is also related to U.S. patent application Ser. No. 18/070,567, entitled INDUCTIVE HEATING APPARATUS AND OPERATION METHOD THEREOF, filed Nov. 29, 2022.

BACKGROUND OF THE INVENTION

Field of the Invention

The present disclosure relates to an inductive heating apparatus capable of handling the removal of an aerosol forming body.

Description of the Related Art

Conventionally, a device is known that generates an aerosol from an aerosol forming body by using an inductor disposed near the aerosol forming body having a susceptor and heating the susceptor by inductive heating (see Japanese Patent No. 6623175, Japanese Patent No. 6077145 and Japanese Patent No. 6653260).

SUMMARY OF THE INVENTION

In one embodiment, there is provided an inductive heating apparatus for heating an aerosol forming body including a susceptor and an aerosol source. The inductive heating apparatus includes: a power supply; a coil for heating the susceptor through inductive heating; a parallel circuit including a first circuit and a second circuit disposed in parallel between the power supply and the coil, the first circuit being used to heat the susceptor, and the second circuit being used to obtain a value related to an electrical resistance or a temperature of the susceptor; and an alternating current generation circuit disposed between the parallel circuit and the coil or between the parallel circuit and the power supply.

In one embodiment, the alternating current generation circuit is disposed between the parallel circuit and the coil, and the alternating current generation circuit includes a third switch.

In one embodiment, the third switch includes a MOSFET.

In one embodiment, the first circuit includes a first switch, the alternating current generation circuit includes a third switch, and the first switch remains on when the third switch is switched at a predetermined cycle.

In one embodiment, the first switch and the third switch include a MOSFET.

In one embodiment, the second circuit includes a second switch, the alternating current generation circuit includes a third switch, and the second switch remains on when the third switch is switched at a predetermined cycle.

In one embodiment, the second switch includes a bipolar transistor, and the third switch includes a MOSFET.

In one embodiment, the first circuit includes a first switch including a MOSFET, and the second circuit includes a second switch including a bipolar transistor.

In one embodiment, the first circuit includes a first switch; the second circuit includes a second switch; the alternating current generation circuit includes a third switch; and when switching between the first switch and the second switch, switching of the third switch at a predetermined cycle is continued.

In one embodiment, the inductive heating apparatus further includes a current sensing circuit and a voltage sensing circuit used to measure an impedance of a circuit including the susceptor.

In one embodiment, the inductive heating apparatus further includes a remaining amount measurement IC configured to measure a remaining amount in the power supply. The remaining amount measurement IC is not used as the current sensing circuit and/or the voltage sensing circuit.

In one embodiment, the inductive heating apparatus further includes a voltage adjustment circuit configured to adjust a voltage of the power supply and generate a voltage to be supplied to a constituent element within the inductive heating apparatus. The current sensing circuit is disposed in a path between the power supply and the coil, in a position closer to the coil than a branching point from the path to the voltage adjustment circuit.

In one embodiment, the current sensing circuit is not disposed in a path between a charging circuit for charging the power supply and the power supply.

In one embodiment, there is provided an inductive heating apparatus for inductively heating a susceptor of an aerosol forming body including the susceptor and an aerosol source. The inductive heating apparatus includes: a power supply; an alternating current generation circuit that generates alternating current from power supplied from the power supply; an inductive heating circuit for inductively heating the susceptor; and a control unit. The control unit is configured to detect the susceptor based on an impedance of a circuit to which the alternating current generated by the alternating current generation circuit is supplied, and start the inductive heating in response to the susceptor being detected.

In one embodiment, the control unit may further be configured to obtain a temperature of the susceptor based on the impedance of the circuit to which the alternating current generated by the alternating current generation circuit is supplied; and control the inductive heating based on the temperature obtained.

In one embodiment, the control unit can have at least a first mode, in which the impedance of the circuit to which the alternating current generated by the alternating current generation circuit is supplied is measured, and a second mode, in which the impedance of the circuit to which the alternating current generated by the alternating current generation circuit is supplied is not measured.

In one embodiment, a connection unit configured to be capable of connecting to a charging power supply may be further included, and the control unit may further be configured to execute processing in the first mode until a predetermined time has passed after sensing that the charging power supply has been removed from the connection unit.

In one embodiment, the inductive heating apparatus may further include a button, and the control unit may further be configured to transition to the first mode in response to a predetermined operation being made on the button.

In one embodiment, the inductive heating apparatus may further include a button; and the control unit may further be configured to: start a timer such that a value increases or decreases over time from an initial value, in response to transitioning to the first mode; transition to the second mode in response to the value of the timer reaching a predetermined value; and execute one of returning the value of the timer to the initial value, bringing the value of the timer closer to the initial value, or moving the predetermined value away from the value of the timer in response to a predetermined operation being made on the button.

In one embodiment, the inductive heating apparatus may further include a connection unit configured to be capable of connecting to a charging power supply; and the control unit may further be configured such that the impedance of the circuit to which the alternating current generated by the alternating current generation circuit is supplied is not measured while the charging power supply is sensed as being connected to the connection unit.

In one embodiment, the control unit may further be configured to measure the impedance of the circuit to which the alternating current generated by the alternating current generation circuit is supplied at a resonance frequency of the circuit to which the alternating current generated by the alternating current generation circuit is supplied.

In one embodiment, the inductive heating apparatus may further include a first circuit and a second circuit configured to become selectively active to supply energy to the susceptor, the second circuit having a higher resistance than the first circuit.

In one embodiment, the control unit may be configured to execute the inductive heating and measure the impedance of the circuit using the first circuit while the inductive heating is being executed.

Additionally, to solve the above-described second problem, according to embodiments of the present disclosure, there is provided an operation method of an inductive heating apparatus for inductively heating a susceptor of an aerosol forming body including the susceptor and an aerosol source. The inductive heating apparatus includes: a power supply; an alternating current generation circuit that generates alternating current from power supplied from the power supply; and an inductive heating circuit for inductively heating the susceptor. The method includes: a step of detecting the susceptor based on an impedance of a circuit to which the alternating current generated by the alternating current generation circuit is supplied; and a step of starting the inductive heating in response to the susceptor being detected.

Furthermore, to solve the above-described second problem, according to embodiments of the present disclosure, there is provided an inductive heating apparatus for inductively heating a susceptor of an aerosol forming body including the susceptor and an aerosol source. The inductive heating apparatus includes: the aerosol forming body; a power supply; an alternating current generation circuit that generates alternating current from power supplied from the power supply; an inductive heating circuit for inductively heating the susceptor; and a control unit. The control unit is configured to detect the susceptor based on an impedance of a circuit to which the alternating current generated by the alternating current generation circuit is supplied, and start the inductive heating in response to the susceptor being detected.

In one embodiment, there is provided a control unit for an inductive heating apparatus configured to inductively heat a susceptor of an aerosol forming body including the susceptor and an aerosol source. The control unit is configured to stop the inductive heating or make an error notification if the susceptor can no longer be detected while the inductive heating is being executed.

In one embodiment, the control unit may be configured to stop the inductive heating if the susceptor can no longer be detected while the inductive heating is being executed.

In one embodiment, the control unit may further be configured to make an error notification at the same time as or after stopping the inductive heating.

In one embodiment, the control unit may further be configured to resume the inductive heating when the susceptor is again detected before a predetermined time has passed after the inductive heating is stopped.

In one embodiment, the inductive heating may be configured to follow a heating profile in which at least a heating target temperature according to the elapsation of time is defined, and the control unit may be configured to control the inductive heating assuming that time has also passed between when the inductive heating is stopped and when the inductive heating is restarted.

In one embodiment, the inductive heating may be configured to follow a heating profile in which at least a heating target temperature according to the elapsation of time is defined, and the control unit may be configured to control the inductive heating assuming that time has not passed between when the inductive heating is stopped and when the inductive heating is restarted.

In one embodiment, the control unit may be configured to make an error notification if the susceptor can no longer be detected while the inductive heating is being executed.

In one embodiment, the control unit may further be configured to stop the inductive heating after making the error notification.

In one embodiment, the control unit may be configured not to stop the inductive heating if the susceptor is detected again after the error notification and before the inductive heating is stopped.

In one embodiment, the inductive heating may be configured to follow a heating profile in which at least a heating target temperature according to the elapsation of time is defined, and the control unit may be configured such that a period from when the susceptor can no longer be detected to when the susceptor is detected again does not affect an overall length of the heating profile.

In one embodiment, the inductive heating may be configured to follow a heating profile in which at least a heating target temperature according to the elapsation of time is defined, and the control unit may be configured to extend the heating profile based on a period from when the susceptor can no longer be detected to when the susceptor is detected again.

Additionally, to solve the above-described third problem, according to embodiments of the present disclosure, there is provided an inductive heating apparatus including: a power supply; an alternating current generation circuit that generates alternating current from power supplied from the power supply; an inductive heating circuit for inductively heating a susceptor included in an aerosol forming body; and a control unit. The control unit is further configured to detect the susceptor based on an impedance of a circuit to which the alternating current generated by the alternating current generation circuit is supplied.

In one embodiment, the control unit may further be configured to obtain a temperature of the susceptor based on the impedance of the circuit to which the alternating current generated by the alternating current generation circuit is supplied; and control the inductive heating based on the temperature obtained.

Additionally, to solve the above-described third problem, according to embodiments of the present disclosure, there is provided an inductive heating apparatus including: a power supply that supplies power for inductively heating a susceptor included in an aerosol forming body; and a control unit. The control unit is configured to set a usable number of units, which is a number of the aerosol forming bodies that can be inductively heated before the power supply is charged, based on a remaining amount in the power supply; and to stop the inductive heating and reduce the usable number of sticks if at least part of the aerosol forming body can no longer be detected while the inductive heating is being executed.

Additionally, to solve the above-described third problem, according to embodiments of the present disclosure, there is provided an inductive heating apparatus including: a power supply that supplies power for inductively heating at least part of an aerosol forming body; and the control unit. The control unit is configured to set a usable number of units, which is a number of the aerosol forming bodies that can be inductively heated before the power supply is charged, based on a remaining amount in the power supply; and if, after the susceptor can no longer be detected while the inductive heating is being executed, the susceptor is again detected, to continue the inductive heating and not reduce the usable number of units.

Additionally, to solve the above-described third problem, according to embodiments of the present disclosure, there is provided an operation method of an inductive heating apparatus configured to inductively heat a susceptor of an aerosol forming body including the susceptor and an aerosol source. The method includes a step of stopping the inductive heating or making an error notification if the susceptor can no longer be detected while the inductive heating is being executed.

Furthermore, to solve the above-described third problem, according to embodiments of the present disclosure, there is provided an inductive heating apparatus for inductively heating a susceptor of an aerosol forming body including the susceptor and an aerosol source. The inductive heating apparatus includes: the aerosol forming body; a power supply; an alternating current generation circuit that generates alternating current from power supplied from the power supply; an inductive heating circuit for inductively heating the susceptor; and a control unit. The control unit is configured to stop the inductive heating or make an error notification if the susceptor can no longer be detected while the inductive heating is being executed.

In one embodiment, there is provided an inductive heating apparatus for heating an aerosol forming body including a susceptor and an aerosol source. The inductive heating apparatus includes a circuit including a coil for heating the susceptor through inductive heating. The susceptor is heated by a heating mode constituted by a plurality of phases, and a frequency of AC current supplied to the coil is different in at least some of the plurality of phases.

In one embodiment, in a pre-heating mode of pre-heating the susceptor, executed before the heating mode, the frequency of the AC current is a resonance frequency of the circuit.

In one embodiment, in the pre-heating mode of pre-heating the susceptor, executed before the heating mode, the frequency of the AC current is configured to be closest to the resonance frequency of the circuit, compared to the plurality of phases of the heating mode.

In one embodiment, in the heating mode, the frequency of the AC current is a frequency aside from the resonance frequency of the circuit.

In one embodiment, the frequency of the AC current increases as the plurality of phases constituting the heating mode progress, and suction by a user is detected based on a change in the AC current or a change in impedance of the circuit.

In one embodiment, the frequency of the AC current increases in a frequency region higher than the resonance frequency as the plurality of phases constituting the heating mode progress.

In one embodiment, the frequency of the AC current increases in a frequency region lower than the resonance frequency as the plurality of phases constituting the heating mode progress.

In one embodiment, the frequency of the AC current decreases as the plurality of phases constituting the heating mode progress.

In one embodiment, in an interval mode of cooling the susceptor, executed between the pre-heating mode and the heating mode, the frequency of the AC current is the resonance frequency of the circuit.

In one embodiment, the inductive heating apparatus further includes a power supply. The circuit further includes a parallel circuit including a first circuit and a second circuit disposed in parallel between the power supply and the coil, the first circuit being used to heat the susceptor, and the second circuit being used to obtain a value related to an electrical resistance or a temperature of the susceptor. The second circuit is used in the interval mode.

In one embodiment, there is further provided an inductive heating apparatus for heating an aerosol forming body including a susceptor and an aerosol source. The inductive heating apparatus includes a circuit including a coil for heating the susceptor through inductive heating. The susceptor is heated by a heating mode constituted by a plurality of phases, and a frequency of AC current supplied to the coil is constant throughout the plurality of phases.

In one embodiment, the frequency of the AC current is the resonance frequency of the circuit.

In one embodiment, in an interval mode of cooling the susceptor after pre-heating the susceptor, executed before the heating mode, the frequency of the AC current is the resonance frequency of the circuit.

In one embodiment, the inductive heating apparatus further includes a power supply. The circuit further includes a parallel circuit including a first circuit and a second circuit disposed in parallel between the power supply and the coil, the first circuit being used to heat the susceptor, and the second circuit being used to obtain a value related to an electrical resistance or a temperature of the susceptor. The second circuit is used in the interval mode.

In one embodiment, in the heating mode, the heating of the susceptor is suspended if the temperature of the susceptor is determined to have become at least a predetermined temperature.

In one embodiment, the inductive heating apparatus further includes a power supply. The circuit further includes a parallel circuit including a first circuit and a second circuit disposed in parallel between the power supply and the coil, the first circuit being used to heat the susceptor, and the second circuit being used to obtain a value related to an electrical resistance or a temperature of the susceptor. The temperature of the susceptor is monitored using the second circuit while the heating of the susceptor is suspended.

In one embodiment, in the heating mode, the heating of the susceptor is resumed using the first circuit if the temperature of the susceptor is determined to have become lower than the predetermined temperature.

In one embodiment, in the heating mode, the heating of the susceptor is resumed using the first circuit if the temperature of the susceptor is determined to have become lower than the predetermined temperature by a predetermined temperature.

In one embodiment, the circuit further includes an alternating current generation circuit disposed between the parallel circuit and the coil or between the parallel circuit and the power supply. The alternating current generation circuit includes a third switch. The third switch is switched at a predetermined cycle while the heating of the susceptor is suspended.

BRIEF DESCRIPTION OF THE DRAWINGS

FIG. 16 is a diagram illustrating a flowchart of another example of sub processing in a PRE-HEAT mode, an INTERVAL mode, or a HEAT mode, executed by a control unit of an inductive heating apparatus according to one embodiment of the present disclosure.

FIG. 17 is a diagram illustrating an equivalent circuit of an RLC series circuit.

DESCRIPTION OF THE EMBODIMENTS

Hereinafter, embodiments of the present disclosure will be described in detail with reference to the drawings. Note that the embodiments of an inductive heating apparatus according to the present disclosure include an inductive heating apparatus for an electronic cigarette and an inductive heating apparatus for a heated tobacco product, but are not limited thereto.

Figure 1:
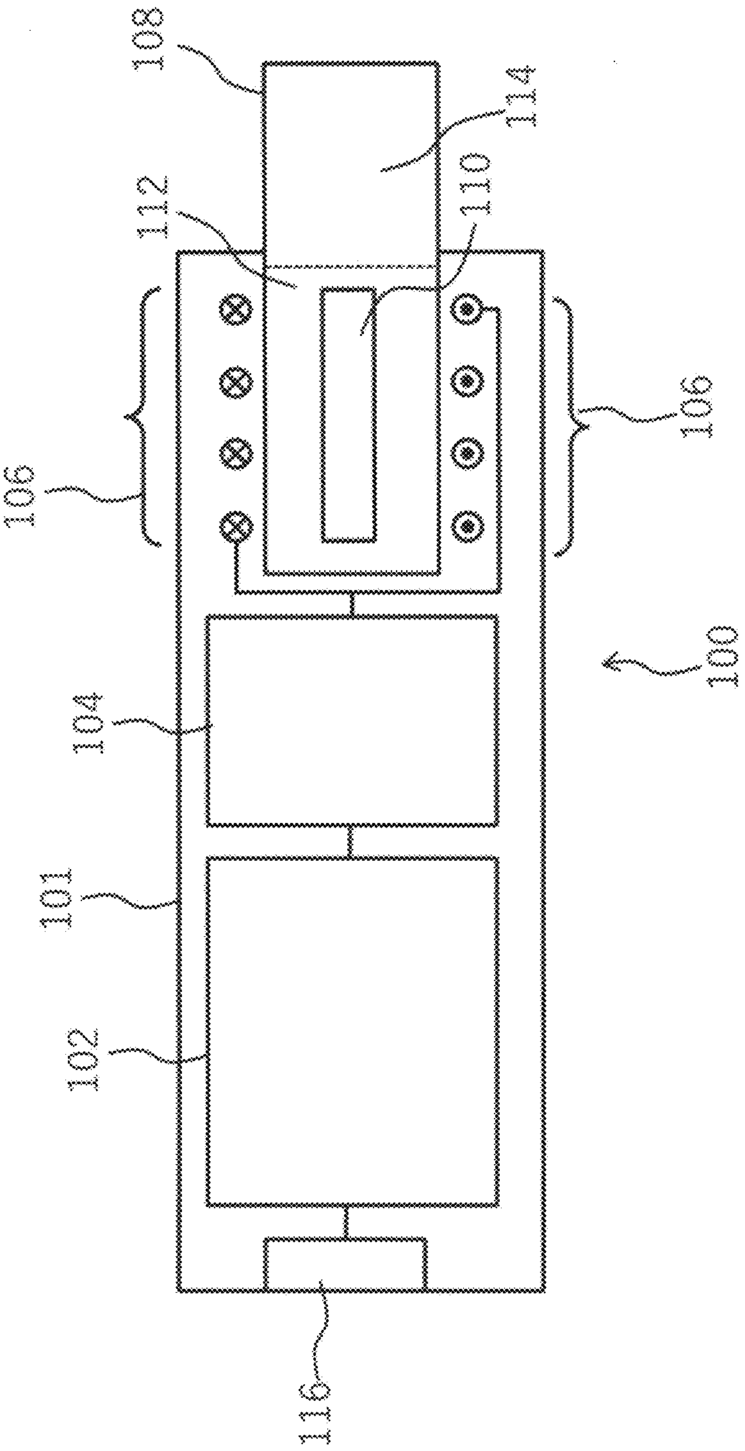
FIG. 1 is an overall block diagram of the configuration of an inductive heating apparatus according to one embodiment of the present disclosure.

FIG. 1 is an overall block diagram of the configuration of an inductive heating apparatus 100 according to one embodiment of the present disclosure. Note that FIG. 1 does not illustrate the exact arrangements, shapes, dimensions, positional relationships, and the like of the constituent elements.

The inductive heating apparatus 100 includes a housing 101, a power supply 102, a circuit 104, and a coil 106. The power supply 102 is a rechargeable battery such as a lithium-ion secondary battery. The circuit 104 is electrically connected to the power supply 102. The circuit 104 is configured to supply power to the constituent elements of the inductive heating apparatus 100 using the power supply 102. The specific configuration of the circuit 104 will be described later. The inductive heating apparatus 100 includes a charging power supply connection unit 116 for connecting the inductive heating apparatus 100 to a charging power supply (not shown) for charging the power supply 102. The charging power supply connection unit 116 may be a receptacle for wired charging, a power receiving coil for wireless charging, or a combination thereof.

The inductive heating apparatus 100 is configured to be capable of accommodating at least part of an aerosol forming body 108, which includes a susceptor 110, an aerosol source 112, and a filter 114. The aerosol forming body 108 may be, for example, a smoking article.

The aerosol source 112 can contain a volatile compound capable of generating an aerosol by being heated. The aerosol source 112 may be a solid, a liquid, or may contain both a solid and a liquid. The aerosol source 112 may include, for example, a polyhydric alcohol such as glycerin, propylene glycol, or the like, a liquid such as water, or a mixture of these liquids. The aerosol source 112 may contain nicotine. The aerosol source 112 may also contain a tobacco material formed by agglomerating tobacco in particulate form. Alternatively, the aerosol source 112 may contain a non-tobacco containing material.

The coil 106 is embedded in the housing 101 at a proximal end of the housing 101. The coil 106 is configured to surround the part of the aerosol forming body 108 contained within the inductive heating apparatus 100 when the aerosol forming body 108 is inserted into the inductive heating apparatus 100. The coil 106 may have a shape wound in a spiral. The coil 106 is electrically connected to the circuit 104, and is used for heating the susceptor 110 through inductive heating, as will be described later. Heating the susceptor 110 produces an aerosol from the aerosol source 112. A user can suck the aerosol through the filter 114.

Figure 2:
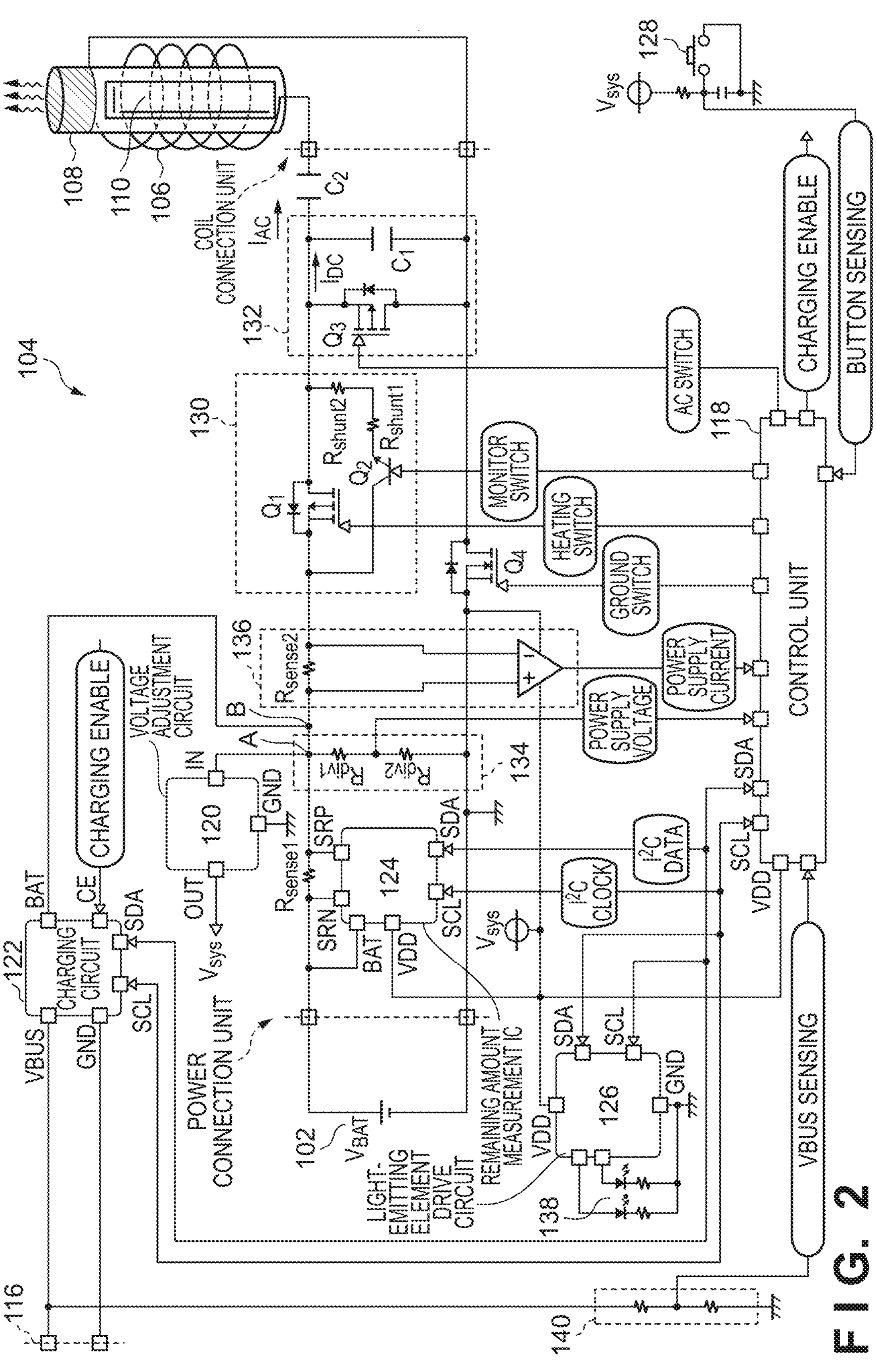
FIG. 2 is a diagram illustrating a circuit configuration of an inductive heating apparatus according to one embodiment of the present disclosure.

FIG. 2 illustrates the configuration of the circuit 104 in detail. The circuit 104 includes a control unit 118 configured to control the constituent elements within the inductive heating apparatus 100. The control unit 118 may be constituted by a Micro Controller Unit (MCU). The circuit 104 is also electrically connected to the power supply 102 by a power supply connection unit, and is electrically connected to the coil 106 by a coil connection unit. The circuit 104 includes a parallel circuit 130, which in turn includes a path including a switch $Q_1$ disposed between the power supply 102 and the coil 106 (also called a "first circuit" hereinafter) and a path including a switch $Q_2$ disposed in parallel with the switch $Q_1$ (also called a "second circuit" hereinafter).

The first circuit is used to heat the susceptor 110. As one example, the switch $Q_1$ may be a Metal-Oxide-Semiconductor Field Effect Transistor (MOSFET). The control unit 118 controls the switch $Q_1$ on/off by applying a heating switch signal (high or low) to a gate terminal of the switch $Q_1$. For example, if the switch $Q_1$ is a P-channel MOSFET, the switch $Q_1$ is on when the heating switch signal is low.

The second circuit is used to obtain a value related to an electrical resistance or a temperature of the susceptor 110. The value related to the electrical resistance or the temperature may be an impedance, a temperature, or the like, for example. A current flowing through the switch $Q_2$ when the switch $Q_2$ is on is lower than a current flowing through the switch $Q_1$ when the switch $Q_1$ is on, due to a resistor $R_{shunt1}$, a resistor $R_{shunt2}$, and the like, which will be described later. Accordingly, a bipolar transistor, which is less expensive and smaller than a MOSFET but is not suited to high currents, may be used as the switch $Q_2$. As illustrated in the drawing, the second circuit may include the resistor $R_{shunt1}$ and the resistor $R_{shunt2}$. The control unit 118 controls the switch $Q_2$ on/off by applying a monitor switch signal (high or low) to a base terminal of the switch $Q_2$. For example, if the switch $Q_2$ is an npn-type bipolar transistor, the switch $Q_2$ is on while the monitor switch signal is low.

The control unit 118 can switch between a mode in which aerosol is generated by inductively heating the susceptor 110 and a mode in which the value related to the electrical resistance or the temperature of the susceptor 110 is obtained by switching between the switch $Q_1$ being on and the switch $Q_2$ being on. The switching between the switch $Q_1$ being on and the switch $Q_2$ being on may be performed at any timing. For example, the control unit 118 may turn the switch $Q_1$ on and the switch $Q_2$ off during a puff by the user. In this case, the control unit 118 may turn the switch $Q_1$ off and the switch $Q_2$ on when the puff ends. Alternatively, the control unit 118 may switch between the switch $Q_1$ being on and the switch $Q_2$ being on at any timing during a puff by the user.

The circuit 104 includes an alternating current generation circuit 132, which in turn includes a switch $Q_3$ and a capacitor $C_1$. As one example, the switch $Q_3$ may be a MOSFET. The control unit 118 controls the switch $Q_3$ on/off by applying an alternating current (AC) switch signal (high or low) to a gate terminal of the switch $Q_3$. For example, if the switch $Q_3$ is a P-channel MOSFET, the switch $Q_3$ is on when the AC switch signal is low. In FIG. 2, the alternating current generation circuit 132 is disposed between the parallel circuit 130 and the coil 106. As another example, the alternating current generation circuit 132 may be disposed between the parallel circuit 130 and the power supply 102. The alternating current generated by the alternating current generation circuit 132 is supplied to an inductive heating circuit, which includes a capacitor $C_2$, the coil connection unit, and the coil 106.

Figure 3:
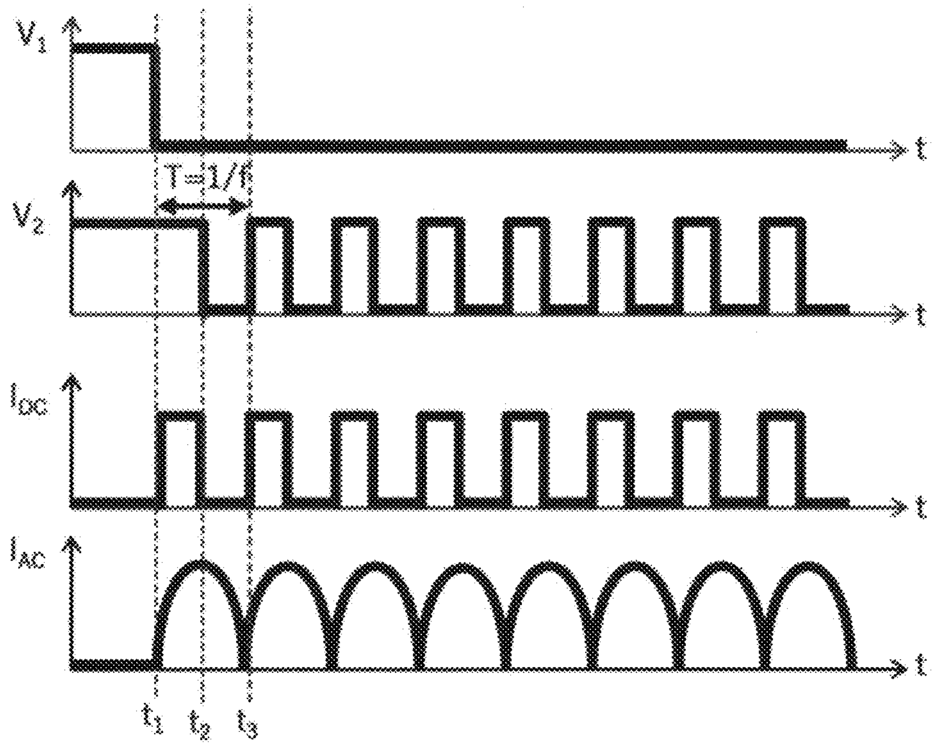
FIG. 3 is a diagram conceptually illustrating a relationship among a voltage applied to a gate terminal of a switch $Q_1$ or a base terminal of a switch $Q_2$, a voltage applied to a gate terminal of a switch $Q_3$, a current $I_{DC}$, and a current $I_{AC}$, with time t on a horizontal axis.

FIG. 3 is a diagram conceptually illustrating a relationship among a voltage $V_1$ applied to the gate terminal of the switch $Q_1$ or the base terminal of the switch $Q_2$, a voltage $V_2$ applied to the gate terminal of a switch $Q_3$, a current $I_{DC}$ generated by switching of the switch $Q_3$, and a current $I_{AC}$ flowing to the coil 106, when AC current to be supplied to the coil 106 is generated by the alternating current generation circuit 132, with time t on the horizontal axis. Note that to simplify the descriptions, the voltage applied to the gate terminal of the switch $Q_1$ and the voltage applied to the base terminal of the switch $Q_2$ are represented in a single graph as $V_1$.

When $V_1$ goes to low at time $t_1$, the switch $Q_1$ or $Q_2$ turns on. When $V_2$ is high, switch $Q_3$ turns off, the current $I_{DC}$ flows to the capacitor C1, and a charge is accumulated in the capacitor C1. When $V_2$ switches to low at time $t_2$, the switch $Q_3$ turns on. In this case, the flow of the current $I_{DC}$ stops, and the charge accumulated in C1 is discharged. The same operations are repeated from time $t_3$ onward. As a result of the above-described operations, the AC current $I_{AC}$ is generated and flows to the coil 106, as illustrated in FIG. 3.

As illustrated in FIG. 3, the switch $Q_1$ may remain on when the switch $Q_3$ is switched at a predetermined period T. Additionally, the switch $Q_2$ may remain on when the switch $Q_3$ is switched at the predetermined period T. The switching of the switch $Q_3$ at the predetermined period T may continue during switching between the switch $Q_1$ and the switch $Q_2$.

The above-described configuration of the alternating current generation circuit 132 is merely one example. It should be understood that a variety of devices for generating the AC current $I_{AC}$, integrated circuits such as DC/AC inverters, and the like can be used as the alternating current generation circuit 132.

As can be seen from FIG. 3, a frequency f of the AC current $I_{AC}$ is controlled by a switching period T of the switch $Q_3$ (i.e., a switching period of the AC switch signal). When the switch $Q_1$ is on, as the frequency f approaches a resonance frequency $f_0$ of the RLC series circuit including the susceptor 110 (or a circuit including the susceptor 110), the coil 106, and the capacitor $C_2$, the efficiency of the supply of energy to the susceptor 110 increases. Although details will be given later, it should be noted that the susceptor 110 is included in this RLC series circuit when the aerosol forming body 108 is inserted into the housing 101, but the susceptor 110 is not included in this RLC series circuit when the aerosol forming body 108 is not inserted into the housing 101.

The AC current generated as described above flows through the coil 106, which produces an alternating magnetic field around the coil 106. The alternating magnetic field which is produced induces eddy current within the susceptor 110. Joule heat is produced by the eddy current and the electrical resistance of the susceptor 110, which heats the susceptor 110. As a result, the aerosol source around the susceptor 110 is heated, and an aerosol is generated.

Returning to FIG. 2, the circuit 104 includes a voltage sensing circuit 134, which in turn includes a voltage divider circuit having $R_{div1}$ and $R_{div2}$. A voltage value of the power supply 102 can be measured by the voltage sensing circuit 134. The circuit 104 also includes a current sensing circuit 136, which in turn includes $R_{sense2}$. As illustrated in the drawing, the current sensing circuit 136 may include an op-amp. The op-amp may instead be included in the control unit 118. The value of current flowing in the direction of the coil 106 can be measured by the current sensing circuit 136. The voltage sensing circuit 134 and the current sensing circuit 136 are used for measuring the impedance of a circuit. This circuit includes the susceptor 110 when the aerosol forming body 108 is inserted into the housing 101, but does not include the susceptor 110 when the aerosol forming body 108 is not inserted into the housing 101. In other words, a resistance component of the susceptor 110 is included in the measured impedance when the aerosol forming body 108 is inserted into the housing 101, but the resistance component of the susceptor 110 is not included in the measured impedance when the aerosol forming body 108 is not inserted into the housing 101. For example, as illustrated in the drawing, the control unit 118 obtains a voltage value from the voltage sensing circuit 134 and obtains a current value from the current sensing circuit 136. The control unit 118 calculates the impedance based on the voltage value and the current value. More specifically, the control unit 118 calculates the impedance by dividing an average value or an effective value of the voltage value by an average value or an effective value of the current value.

When the switch $Q_1$ turns off and the switch $Q_2$ turns on, the RLC series circuit is formed by the circuit including the resistor $R_{shunt1}$ and the resistor $R_{shunt2}$, along with the susceptor 110, the coil 106, and the capacitor $C_2$. The impedance of this RLC series circuit can be obtained as described above. The impedance of the susceptor 110 can be calculated by subtracting the resistance value of the circuit, including the resistance values of the resistor $R_{shunt1}$ and the resistor $R_{shunt2}$, from the obtained impedance. When the impedance of the susceptor 110 is temperature dependent, the temperature of the susceptor 110 can be estimated based on the calculated impedance.

The circuit 104 may include a remaining amount measurement integrated circuit (IC) 124. The circuit 104 may include a resistor $R_{sense1}$ used by the remaining amount measurement IC 124 to measure a value of current with which the power supply 102 is charged and discharged. The resistor $R_{sense1}$ may be connected between an SRN terminal and an SRP terminal of the remaining amount measurement IC 124. The remaining amount measurement IC 124 may obtain a value pertaining to the voltage of the power supply 102 through a BAT terminal. The remaining amount measurement IC 124 is an IC configured to be capable of measuring a remaining amount in the power supply 102. The remaining amount measurement IC 124 may additionally be configured to record information pertaining to a degradation state of the power supply 102 and the like. For example, by transmitting an $I^2C$ data signal from an SDA terminal of the control unit 118 to an SDA terminal of the remaining amount measurement IC 124, the control unit 118 can obtain a value pertaining to a remaining amount in the power supply 102, a value pertaining to the degradation state of the power supply 102, and the like, stored within the remaining amount measurement IC 124, in accordance with the timing at which an $I^2C$ clock signal is transmitted from an SCL terminal of the control unit 118 to an SCL terminal of the remaining amount measurement IC 124.

Normally, the remaining amount measurement IC 124 is configured to update the data in one-second cycles. Accordingly, if an attempt is made to calculate the impedance of the RLC series circuit using the voltage value and the current value measured by the remaining amount measurement IC 124, the impedance is calculated in one-second cycles at the fastest. This means that the temperature of the susceptor 110 is also estimated at one-second cycles at the fastest. Such cycles cannot be said to be short enough to appropriately control the heating of the susceptor 110. Accordingly, in the present embodiment, it is desirable not to use the voltage value and the current value measured by the remaining amount measurement IC 124 to measure the impedance of the RLC series circuit. In other words, it is preferable that the remaining amount measurement IC 124 not be used as the voltage sensing circuit 134 and the current sensing circuit 136 described above. The remaining amount measurement IC 124 is therefore not necessary in the inductive heating apparatus 100 according to the present embodiment. However, using the remaining amount measurement IC 124 does make it possible to accurately grasp the state of the power supply 102.

The inductive heating apparatus 100 may include a light-emitting element 138, such as an LED or the like. The circuit 104 may include a light-emitting element drive circuit 126 for driving the light-emitting element 138. The light-emitting element 138 can be used for providing the user with various information on the state of the inductive heating apparatus 100 and the like. The light-emitting element drive circuit 126 may store information pertaining to various light-emitting modes of the light-emitting element 138. The control unit 118 can control the light-emitting element drive circuit 126 to cause the light-emitting element 138 to emit light in a desired manner by transmitting the $I^2C$ data signal from the SDA terminal of the control unit 118 to the SDA terminal of the light-emitting element drive circuit 126 and specifying a desired light-emitting mode.

The circuit 104 may include a charging circuit 122. The charging circuit 122 may be an IC configured to adjust a voltage supplied from the charging power supply (not shown) connected through the charging power supply connection unit 116 (a potential difference between a VBUS terminal and a GND terminal) to a voltage suited to charging the power supply 102, in response to a charge enable signal from the control unit 118 received at a CE terminal. The adjusted voltage is supplied from the BAT terminal of the charging circuit 122. Note that an adjusted current may be supplied from the BAT terminal of the charging circuit 122. The circuit 104 may also include a voltage divider circuit 140. When the charging power supply is connected, a VBUS sensing signal is transmitted from the VBUS terminal of the charging circuit 122 to the control unit 118 through the voltage divider circuit 140. When the charging power supply is connected, the VBUS sensing signal is at a value obtained by dividing the voltage supplied from the charging power supply by the voltage divider circuit 140, and thus the VBUS sensing signal is at high level. When not connected, the charging power supply is grounded through the voltage divider circuit 140, and thus the VBUS sensing signal is at low level. Accordingly, the control unit 118 can determine that charging has started. Note that the CE terminal may be positive logic or negative logic.

The circuit 104 may include a button 128. When the user presses the button 128, the circuit is grounded through the button 128, and as a result, a low-level button sensing signal is transmitted to the control unit 118. Through this, the control unit 118 can determine that the button has been pressed, and can control the circuit 104 to start generating the aerosol.

The circuit 104 may include a voltage adjustment circuit 120. The voltage adjustment circuit 120 is configured to adjust a voltage $V_{BAT}$ of the power supply 102 (e.g., 3.2 to 4.2 volts) and generate a voltage $V_{sys}$ (e.g., 3 volts) to be supplied to the constituent elements in the circuit 104 or the inductive heating apparatus 100. As one example, the voltage adjustment circuit 120 may be a linear regulator such as a low dropout regulator (LDO). As illustrated in the drawing, the voltage $V_{sys}$ generated by the voltage adjustment circuit 120 may be supplied to a circuit including a VDD terminal of the control unit 118, a VDD terminal of the remaining amount measurement IC 124, a VDD terminal of the light-emitting element drive circuit 126, and the button 128, or the like.

As illustrated in the drawing, the current sensing circuit 136 may be disposed in a path between the power supply 102 and the coil 106, in a position closer to the coil 106 than a branching point from that path to the voltage adjustment circuit 120 (point A in FIG. 2). According to this configuration, the current sensing circuit 136 can accurately measure a value of current supplied to the coil 106, not including the current supplied to the voltage adjustment circuit 120. Accordingly, the impedance, temperature, or the like of the susceptor 110 can be accurately measured or estimated.

The circuit 104 may be configured such that the current sensing circuit 136 is not disposed in a path between the charging circuit 122 and the power supply 102. Specifically, as illustrated in the drawing, the current sensing circuit 136 may be disposed in the path between the power supply 102 and the coil 106, in a position closer to the coil 106 than a branching point from that path to the charging circuit 122 (point B in FIG. 2). According to this configuration, current supplied from the charging circuit 122 can be prevented from flowing in the resistor $R_{sense2}$ within the current sensing circuit 136 while the power supply 102 is charging (the switches $Q_1$ and $Q_2$ are off). Accordingly, the possibility of the resistor $R_{sense2}$ failing can be reduced. Additionally, current can be prevented from flowing to the op-amp of the current sensing circuit 136 while the power supply 102 is charging, which makes it possible to suppress the power consumption.

The circuit 104 may also include a switch $Q_4$ that is switched between on and off by a ground switch signal transmitted from the control unit 118.

Examples of processing executed by the control unit 118 of the inductive heating apparatus 100 will be described next. Note that the following assumes that the control unit 118 has a plurality of modes, i.e., at least seven modes, which are SLEEP, CHARGE, ACTIVE, PRE-HEAT, INTERVAL, HEAT, and ERROR, and the processing executed by the control unit 118 will be described for each mode. Note that inductive heating of the susceptor 100 by the inductive heating apparatus 100 is constituted by the PRE-HEAT mode, the INTERVAL mode, and the HEAT mode.

Figure 4:
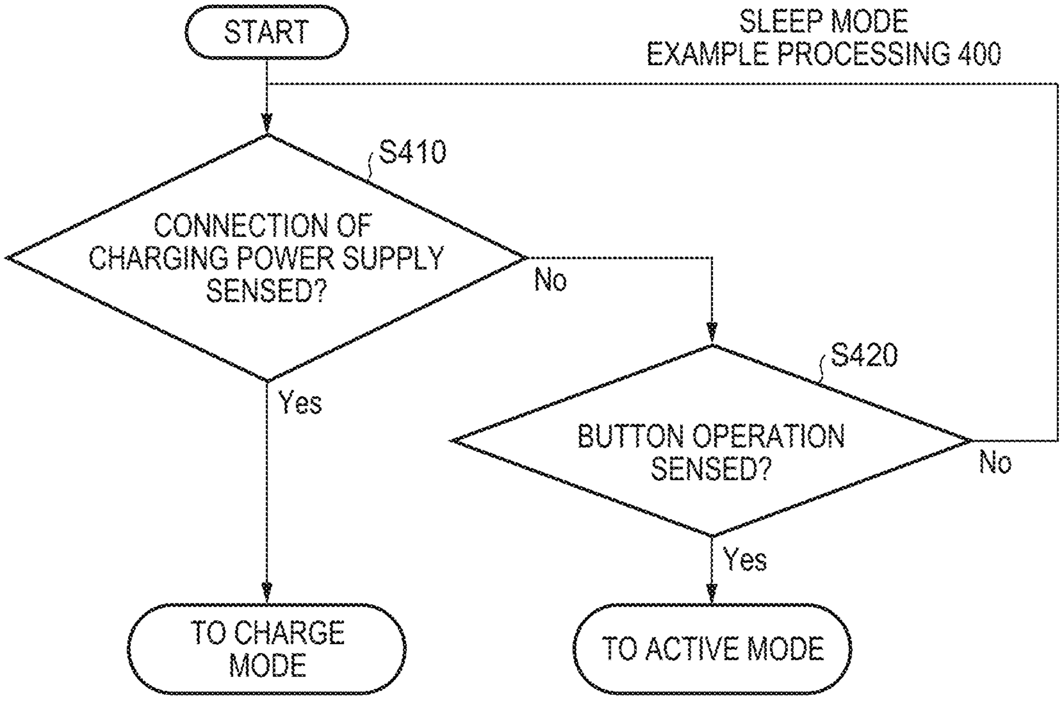
FIG. 4 is a diagram illustrating a flowchart of example processing in a SLEEP mode, executed by a control unit of an inductive heating apparatus according to one embodiment of the present disclosure.

FIG. 4 is a flowchart of example processing 400 executed by the control unit 118 when in SLEEP mode. "SLEEP mode" may be a mode in which power consumption is reduced when the inductive heating apparatus 100 is not in use.

S410 is a step of determining whether the charging power supply has been sensed as being connected to the charging power supply connection unit 116. The control unit 118 can determine whether the connection of the charging power supply is sensed based on the above-described VBUS sensing signal. If the connection of the charging power supply is determined to be sensed ("Yes" in S410), the control unit 118 transitions to the CHARGE mode, and if not ("No" in S410), the processing moves to step S420. As a specific example, in S410, a determination of "Yes" is made when the VBUS sensing signal is at high level, and a determination of "No" is made when the VBUS sensing signal is at low level.

S420 is a step of determining whether a predetermined operation on the button 128 of the inductive heating apparatus 100 has been sensed. The control unit 118 can determine that a predetermined operation has been made on the button 128 based on the above-described button sensing signal. Note that a long press or a series of presses on the button 128 are examples of the predetermined operation in step S420. If the predetermined operation on the button 128 is determined to be sensed ("Yes" in S420), the control unit 118 transitions to the ACTIVE mode, and if not ("No" in S420), the processing returns to step S410.

According to the example of processing 400, the control unit 118 transitions to the CHARGE mode in response to the connection of the charging power supply being sensed, and transitions to the ACTIVE mode in response to an operation on the button being sensed. In other words, the control unit 118 remains in the SLEEP mode when neither the connection of the charging power supply nor the operation on the button are sensed.

Figure 5:
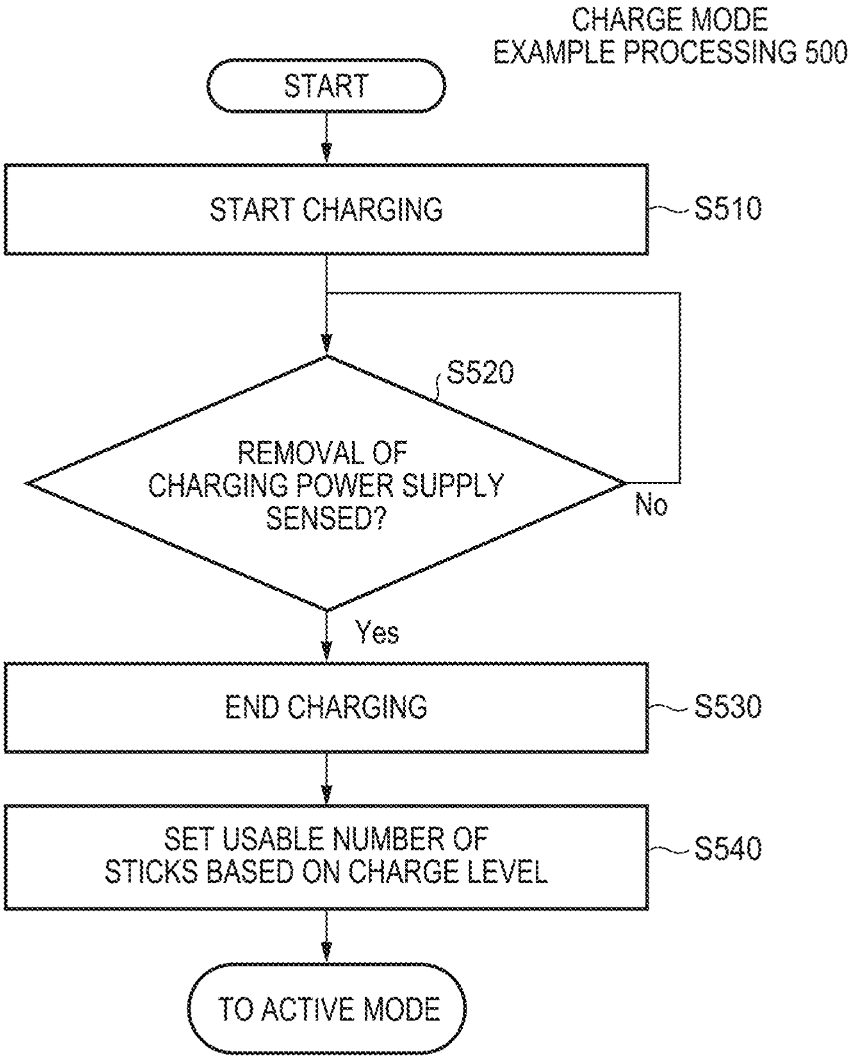
FIG. 5 is a diagram illustrating a flowchart of example processing in a CHARGE mode, executed by a control unit of an inductive heating apparatus according to one embodiment of the present disclosure.

FIG. 5 is a flowchart of example processing 500 executed by the control unit 118 when in CHARGE mode. The example of processing 500 can be started in response to the control unit 118 transitioning to the CHARGE mode.

S510 is a step of executing processing for starting the charging of the power supply 102. The processing for starting the charging of the power supply 102 may include processing that turns on the above-described charge enable signal or starts transmission of that signal. Turning on the charge enable signal refers to setting the level of the charge enable signal to a level based on the logic of the CE terminal. In other words, this refers to setting the charge enable signal to high level when the CE terminal is positive logic, and setting the charge enable signal to low level when the CE terminal is negative logic.

S520 is a step of determining whether the charging power supply has been sensed as being removed from the charging power supply connection unit 116. The control unit 118 can sense that the charging power supply is removed from the charging power supply connection unit 116 based on the above-described VBUS sensing signal. If the removal of the charging power supply is determined to be sensed ("Yes" in S520), the processing moves to step S530, and if not ("No" in S520), the processing returns to step S520.

S530 is a step of executing processing for ending the charging of the power supply 102. The processing for ending the charging of the power supply 102 may include processing that turns off the above-described charge enable signal or ends transmission of that signal. Turning off the charge enable signal refers to setting the level of the charge enable signal to a level not based on the logic of the CE terminal. In other words, this refers to setting the charge enable signal to low level when the CE terminal is positive logic, and setting the charge enable signal to high level when the CE terminal is negative logic.

Figure 6:
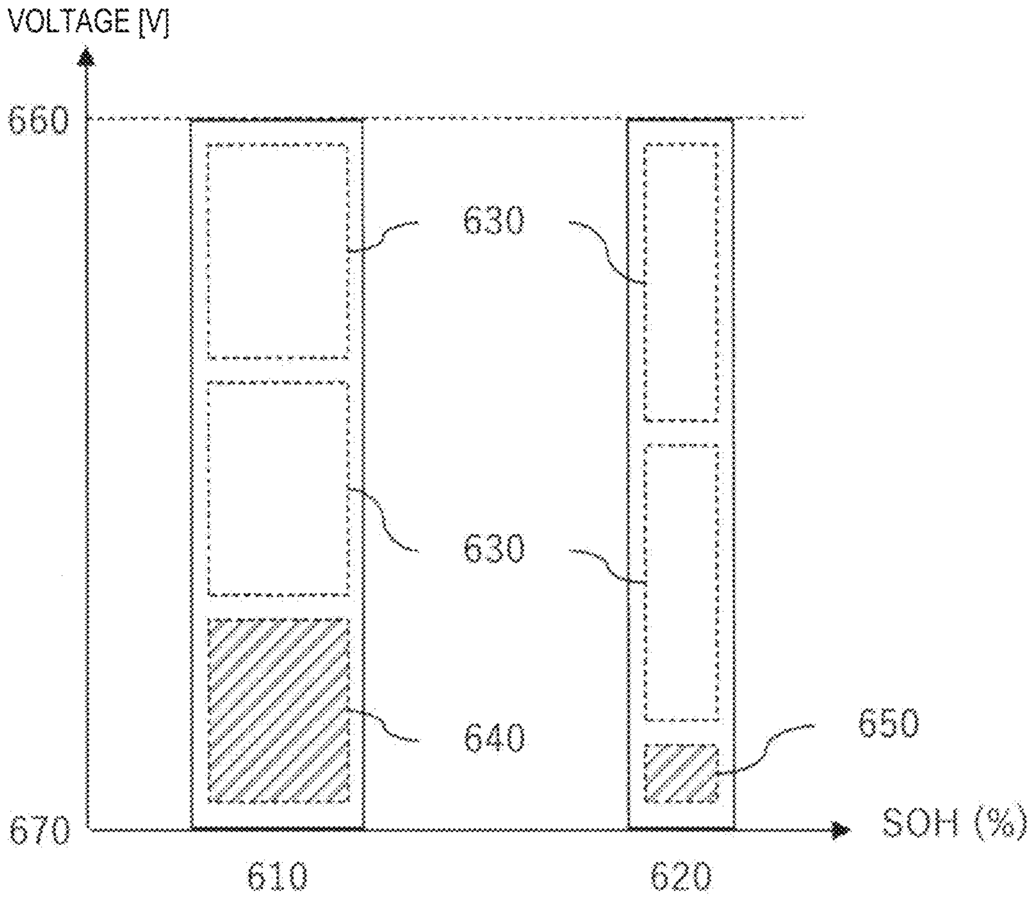
FIG. 6 is a pseudo-graph for illustrating a usable number of sticks.

S540 is a step of setting the usable number of sticks of the aerosol forming body 108 based on a charge level of the power supply 102 (the remaining power amount in the power supply 102) (although the aerosol forming body 108 is assumed to be a stick-shaped body, the shape of the aerosol forming body 108 is not limited thereto. It should therefore be noted that "usable number of sticks" can be generalized as "usable number of units"). The usable number of sticks will be described hereinafter with reference to FIG. 6. FIG. 6 is a pseudo-graph for illustrating the usable number of sticks.

610 indicates a full charge capacity of the power supply 102 corresponding to when the power supply 102 has not yet been used (called "when unused" hereinafter, and the area thereof indicates the full charge capacity when unused. Note that "the power supply 102 not yet being used" may be the number of charges since the power supply 102 was manufactured being zero or less than a first predetermined number of discharges. An example of the full charge capacity of the power supply 102 when unused is approximately 220 mAh. 620 indicates the full charge capacity of the power supply 102 corresponding to when the power supply 102 is used in the inductive heating apparatus 100, and more precisely, to when discharging and charging is repeated and the power supply 102 has degraded to a certain extent (called "when degraded" hereinafter), and the area thereof indicates the full charge capacity when degraded. As is clear from FIG. 6, the full charge capacity of the power supply 102 when unused is greater than the full charge capacity of the power supply 102 when degraded.

630 indicates a power amount (energy) necessary to consume a single aerosol forming body 108, and the area thereof indicates the corresponding power amount. All four 630*s* in FIG. 6 have the same area, and the corresponding power amounts are approximately the same. Note that an example of the power amount 630 necessary to consume a single aerosol forming body 108 is approximately 70 mAh. A single aerosol forming body 108 may be considered to have been consumed when a predetermined number of suctions or heating over a predetermined time period is performed.

640 and 650 indicate a charge level of the power supply 102 after two aerosol forming bodies 108 have been consumed (called a "surplus power amount" hereinafter), and the areas thereof indicate the corresponding power amounts. As is clear from FIG. 6, the surplus power amount 640 when unused is greater than the surplus power amount 650 when degraded.

660 indicates an output voltage of the power supply 102 when fully charged, and an example thereof is approximately 3.64 V. 660 is the same for the power supply 102 when unused (610) and the power supply 102 when degraded (620), which indicates that the voltage of the power supply 102 when fully charged is basically constant regardless of the degradation of the power supply 102, i.e., the State of Health (SOH).

670 indicates a discharge end voltage of the power supply 102, and an example thereof is approximately 2.40 V. 670 is the same for the power supply 102 when unused (610) and the power supply 102 when degraded (620), which indicates that the discharge end voltage of the power supply 102 is basically constant regardless of the degradation of the power supply 102, i.e., the SOH.

It is preferable that the power supply 102 not be used until the voltage reaches the discharge end voltage 670, or in other words, until the charge level of the power supply 102 reaches zero. This is because the power supply 102 degrades more rapidly when the voltage of the power supply 102 drops below the discharge end voltage 670 or when the charge level of the power supply 102 reaches zero. The power supply 102 also degrades more rapidly as the voltage of the power supply 102 approaches the discharge end voltage 670.

Additionally, as described above, when the power supply 102 is used, and more precisely, when discharges and charges are repeated, the full charge capacity decreases, and the surplus power amount after consuming a predetermined number (two, in FIG. 6) of the aerosol forming bodies 108 becomes lower when degraded (650) than when unused (640).

Accordingly, it is preferable for the control unit 118 to set the usable number of sticks based on the expected degradation of the power supply 102, such that the power supply 102 is not used to the point where the voltage reaches or approaches the discharge end voltage 670, or in other words, to the point where the charge level of the power supply 102 reaches or approaches zero. In other words, the usable number of sticks can be set as following, for example.

$$n = \mathrm{int}((e-S)/C)$$

Here, n represents the usable number of sticks; e, the charge level of the power supply 102 (in units of, for example, mAh); S, a parameter for providing a margin to the surplus power amount 650 of the power supply 102 when degraded (in units of, for example, mAh); C, the power amount necessary to consume a single aerosol forming body 108 (in units of, for example, mAh); and int ( ) a function that truncates numbers below the decimal point in the parentheses. Note that e is a variable, and can be obtained by the control unit 118 communicating with the remaining amount measurement IC 124. S and C are constants, and can be obtained experimentally in advance and stored in a memory (not shown) of the control unit 118 in advance. In particular, S may be the surplus power amount 650 obtained when the power supply 102 is experimentally discharged a second predetermined number of discharges (>>a first predetermined number of discharges), i.e., when the assumed degradation occurs, or a value that is +α to the stated surplus power amount. Note that when an SOH obtained by the control unit 118 communicating with the remaining amount measurement IC 124 reaches a predetermined value, the power supply 102 may be determined to have sufficiently degraded, and charging and discharging of the power supply 102 may be prohibited. In other words, "when degraded" when calculating S refers to degradation being advanced more than when unused despite the SOH not having reached the predetermined value.

Returning to FIG. 5, after step S540, the control unit 118 transitions to the ACTIVE mode. Note that in the embodiment described above, in step S520, the control unit 118 determines whether the charging power supply being removed from the charging power supply connection unit 116 is sensed. Instead of this, the charging circuit 122 may determine whether the charging of the power supply 102 is complete, and may determine whether the control unit 118 has received that determination through $I^2C$ communication or the like.

Figure 7:
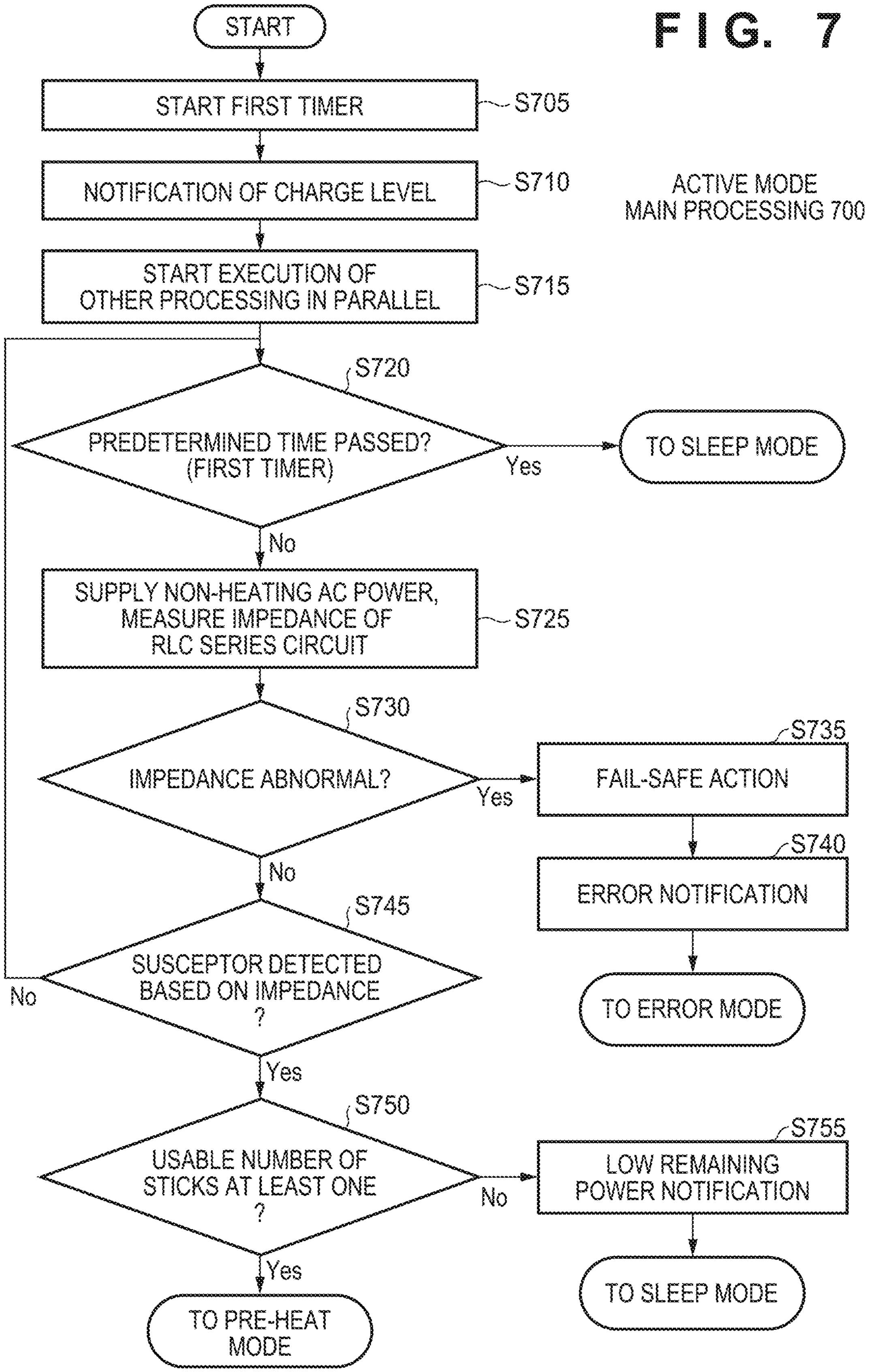
FIG. 7 is a diagram illustrating a flowchart of example main processing in an ACTIVE mode, executed by a control unit of an inductive heating apparatus according to one embodiment of the present disclosure.

FIG. 7 is a flowchart of example processing (called "main processing" hereinafter) 700 executed mainly by the control unit 118 when in ACTIVE mode. The main processing 700 can be started in response to the control unit 118 transitioning to the ACTIVE mode.

S705 is a step of starting a first timer. By starting the first timer, the value of the first timer increases or decreases from an initial value as time passes. Note that the value of the first timer is assumed hereinafter to increase as time passes. The first timer may be stopped when the control unit 118 transitions to another mode. The same applies to a second timer and a third timer, which will be described later.

S710 is a step of notifying the user of the charge level of the power supply 102. The notification of the charge level can be realized by the control unit 118 communicating with the light-emitting element drive circuit 126 based on information on the power supply 102 obtained through communication with the remaining amount measurement IC 124 and causing the light-emitting element 138 to emit light in a predetermined manner. The same applies to the other notifications described later. It is preferable that the notification of the charge level be performed temporarily.

S715 is a step of starting other processing (called "sub processing" hereinafter) to be executed in parallel with the main processing 700. The sub processing started in this step will be described later. Note that the execution of the sub processing may be stopped when the control unit 118 transitions to another mode. The same applies to the other sub processing described later.

S720 is a step of determining whether a predetermined time has passed based on the value of the first timer. If it is determined that the predetermined time has passed ("Yes" in S720), the control unit 118 transitions to the SLEEP mode, and if not ("No" in S720), the processing moves to step S725.

S725 is a step of controlling non-heating AC power to be supplied to the above-described RLC series circuit, i.e., the circuit for inductively heating the susceptor 110 which is at least a part of the aerosol forming body 108, and measuring the impedance of the RLC series circuit. The non-heating AC power may be generated by turning the switch $Q_1$ off, turning the switch $Q_2$ on, and then switching the switch $Q_3$. The average value or effective value of the energy provided to the RLC series circuit by supplying the non-heating AC power is lower than the average value or effective value of the energy provided to the RLC series circuit by supplying heating AC power, which will be described later. Note that it is preferable that the non-heating AC power have the resonance frequency $f_0$ of the RLC series circuit.

Note that the supply of the non-heating AC power is only for measuring the impedance of the RLC series circuit. Accordingly, the supply of the non-heating AC power may be promptly terminated after obtaining data for measuring the impedance of the RLC series circuit (e.g., an effective value $V_{RMS}$ of the voltage and an effective value $I_{RMS}$ of the current, measured by the voltage sensing circuit 134 and the current sensing circuit 136 (described later), respectively). On the other hand, the supply of the non-heating AC power may be continued until a predetermined point in time, e.g., until the control unit 118 transitions to another mode. Stopping the supply of the non-heating AC power can be realized by turning the switch $Q_2$ off, stopping the switching of the switch $Q_3$ and turning the switch $Q_3$ off, or both. It should be noted that the switch $Q_1$ may originally be off at the point in time of step S725.

S730 is a step of determining whether the measured impedance is abnormal. The control unit 118 can determine that the measured impedance is abnormal when the impedance measured in step 725 does not fall within a range of impedances including measurement error determined based on the impedance measured when a genuine aerosol forming body 108 is properly inserted into the inductive heating apparatus 100. If the impedance is determined to be abnormal ("Yes" in S730), the processing moves to step S735, and if not ("No" in S730), the processing moves to step S745.

S735 is a step of executing a predetermined fail-safe action. The predetermined fail-safe action may include turning all of the switches $Q_1$, $Q_2$, and $Q_3$ off.

S740 is a step of making a predetermined error notification to the user. After step S740, the control unit 118 transitions to the ERROR mode for performing predetermined error processing. Note that the specific processing in the ERROR mode will not be described.

S745 is a step of determining whether the susceptor 110 has been detected based on the impedance measured in step S725. Note that the detection of the susceptor 110 can be regarded as the detection of the aerosol forming body 108 including the susceptor 110. The detection of the susceptor 110 based on the impedance will be described later.

S750 is a step of determining whether the usable number of sticks is at least one. If the usable number of sticks is at least one ("Yes" in S750), the control unit 118 transitions to the PRE-HEAT mode, and if not ("No" in S750), the processing moves to step S755.

S755 is a step of making a predetermined low remaining power notification to the user, indicating that the power supply 102 has a low remaining power amount. After step S755, the control unit 118 transitions to the SLEEP mode.

As will be described later, the aerosol forming body 108 is inductively heated through the PRE-HEAT processing, which can be transitioned to from step S750. Thus, according to the main processing 700, automatic inductive heating of the aerosol forming body 108 after the aerosol forming body 108 is inserted into the housing 101 can be realized.

Figure 8:
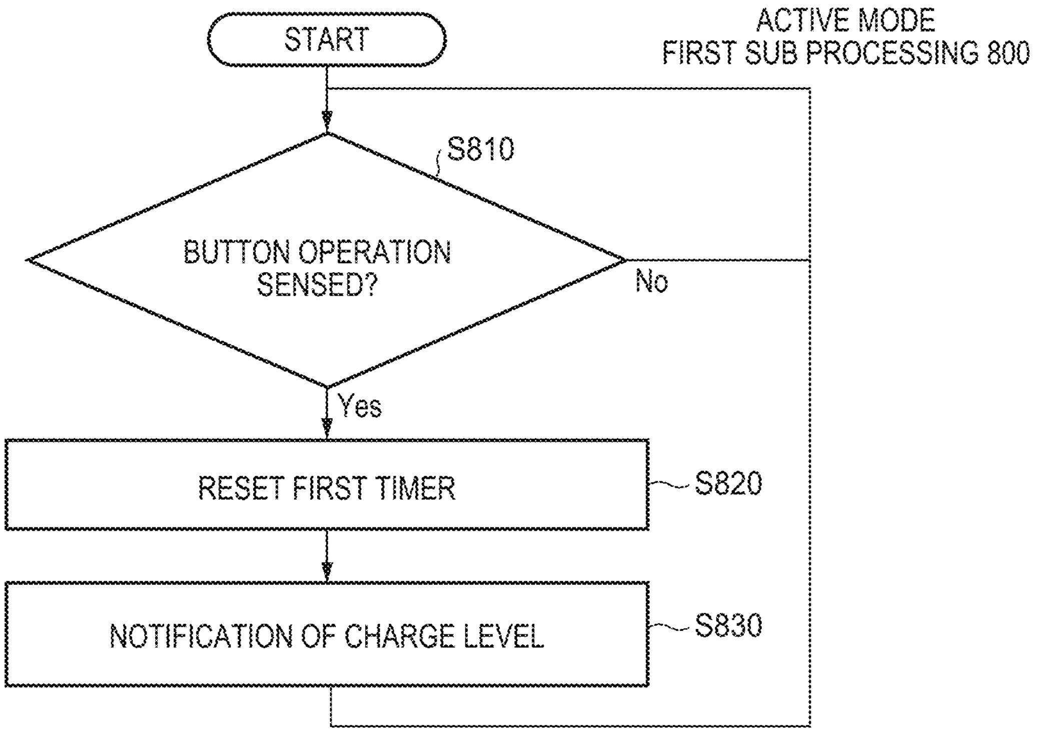
FIG. 8 is a diagram illustrating a flowchart of example sub processing in an ACTIVE mode, executed by a control unit of an inductive heating apparatus according to one embodiment of the present disclosure.

FIG. 8 is a flowchart illustrating an example of first sub processing 800 started in step S715, in the main processing 700 in the ACTIVE mode.

S810 is a step of determining whether a predetermined operation on the button 128 has been sensed. Note that a short press on the button 128 is an example of the predetermined operation in step S810. If it is determined that the predetermined operation on the button 128 is sensed ("Yes" in S810), the processing moves to step S820, and if not ("No" in S810), the processing returns to step S810.

S820 is a step of resetting the first timer and returning the value thereof to the initial value. Instead of the present embodiment, the value of the first timer may be brought closer to the initial value, or the predetermined time in step S720 may be moved away from the value of the first timer.

S830 is a step of notifying the user of the charge level of the power supply 102. After step S830, the processing may be returned to step S810.

According to the main processing 700, the control unit 118 may transition to the SLEEP mode when the predetermined time passes after transitioning to the ACTIVE mode, whereas according to the sub processing 800, the user can be notified of the charge level of the power supply 102 again and the transition to the SLEEP mode can be postponed by making the predetermined operation on the button 128.

Figure 9:
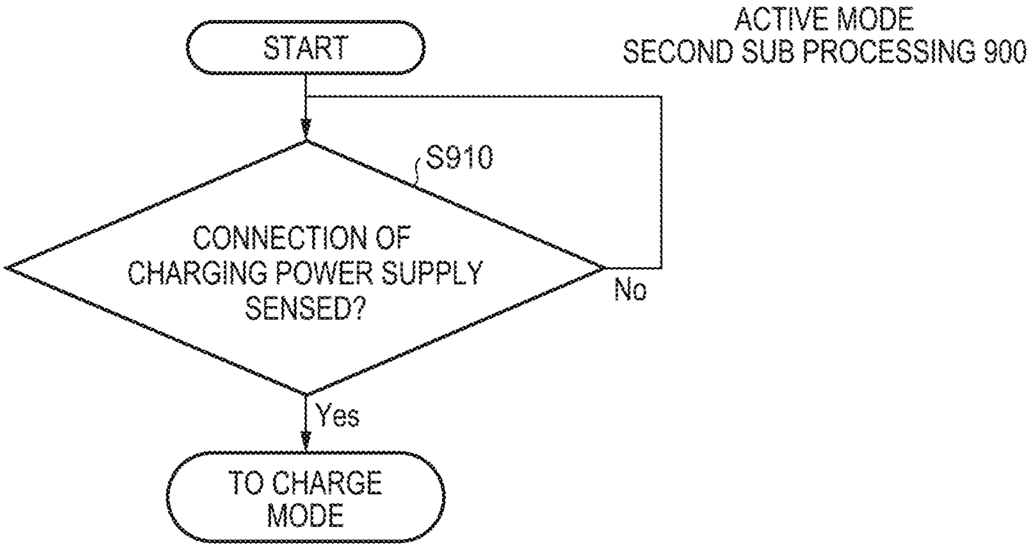
FIG. 9 is a diagram illustrating a flowchart of example other sub processing in an ACTIVE mode, executed by a control unit of an inductive heating apparatus according to one embodiment of the present disclosure.

FIG. 9 is a flowchart illustrating an example of second sub processing 900 started in step S715, in the main processing 700 in the ACTIVE mode.

S910 is a step of determining whether the charging power supply has been sensed as being connected to the charging power supply connection unit 116. If the connection of the charging power supply is determined to be sensed ("Yes" in S910), the control unit 118 transitions to the CHARGE mode, and if not ("No" in S910), the processing returns to step S910. Similar to step S410, the control unit 118 can determine whether the connection of the charging power supply is sensed based on the above-described VBUS sensing signal. Note that when transitioning to the CHARGE mode, it is preferable that the control unit 118 turn all the switches $Q_1$, $Q_2$, and $Q_3$ off.

According to the second sub processing 900, the control unit 118 automatically transitions to the CHARGE mode in response to the charging power supply being connected.

Figure 10:
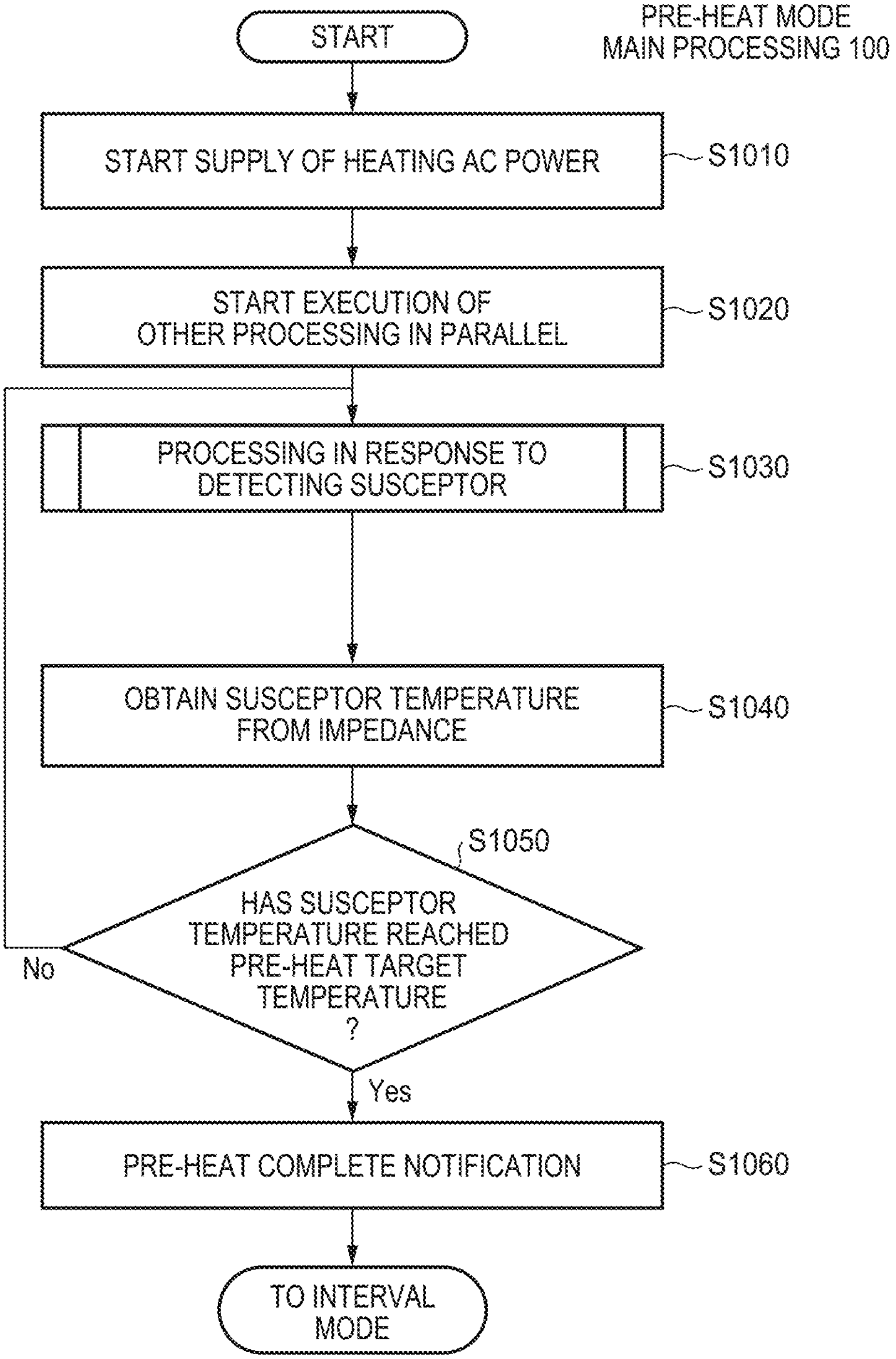
FIG. 10 is a diagram illustrating a flowchart of example main processing in a PRE-HEAT mode, executed by a control unit of an inductive heating apparatus according to one embodiment of the present disclosure.

FIG. 10 is a flowchart of example processing (main processing) 1000 executed mainly by the control unit 118 when in PRE-HEAT mode. The main processing 1000 can be started in response to the control unit 118 transitioning to the PRE-HEAT mode.

S1010 is a step of performing control to start the supply of the heating AC power to the RLC series circuit. The heating AC power is generated by turning the switch $Q_1$ on, turning the switch $Q_2$ off, and then switching the switch $Q_3$. The average value or effective value of the energy provided to the RLC series circuit by supplying the heating AC power is higher than the average value or effective value of the energy provided to the RLC series circuit by supplying the above-described non-heating AC power.

S1020 is a step of starting other processing (sub processing) to be executed in parallel with the main processing 1000. The sub processing started in this step will be described later.

S1030 is a step of executing processing in accordance with the detection of the susceptor 110. This step will be described later. This step includes at least a step of measuring the impedance of the RLC series circuit.

S1040 is a step of obtaining the temperature of the susceptor 110 or at least part of the aerosol forming body 108 (called a "susceptor temperature" hereinafter as appropriate) from the impedance measured in step S1030. The obtainment of the susceptor temperature based on the impedance will be described later. Note that step S1040 may be omitted by using a pre-heat target impedance corresponding to a pre-heat target temperature in step S1050 (described later) instead of the pre-heat target temperature. In this case, the impedance and the pre-heat target impedance are compared in step S1050.

S1050 is a step of determining whether the obtained susceptor temperature has reached a predetermined pre-heat target temperature. If the susceptor temperature is determined to have reached the pre-heat target temperature ("Yes" in S1050), the processing moves to step S1060, and if not ("No" in S1050), the processing returns to step S1030. Note that even if a predetermined time has passed after the start of the PRE-HEAT mode, a determination of "Yes" may be made in step S1050, assuming that the pre-heating is complete.

S1060 is a step of notifying the user that the pre-heating of the aerosol forming body 108 is complete. This notification may be made using the LED 138, or may be made through a vibration motor, a display, or the like (not shown). After step S1060, the control unit 118 transitions to the INTERVAL mode.

According to the main processing 1000, pre-heating of the aerosol forming body 108 can be realized.

Figure 11:
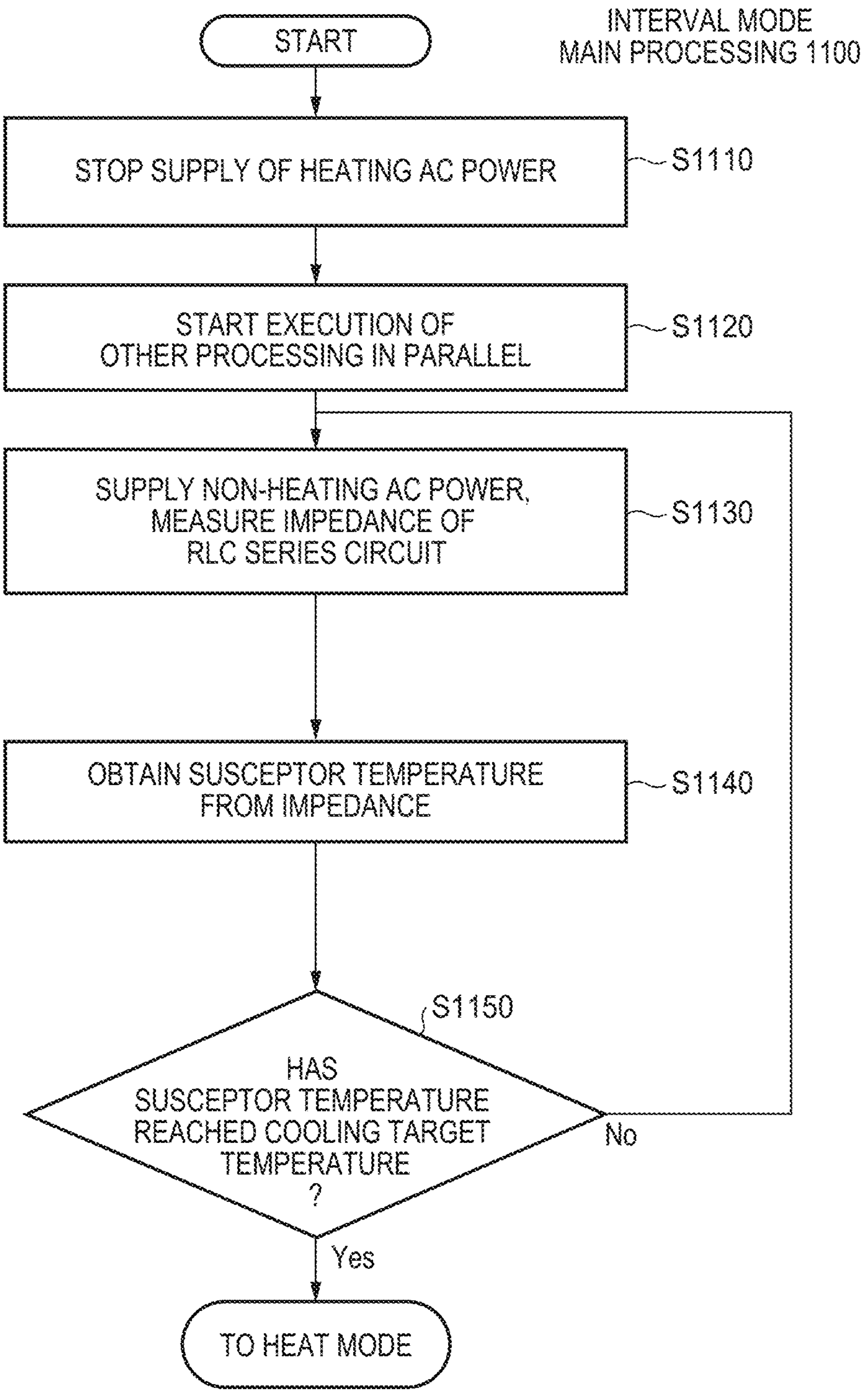
FIG. 11 is a diagram illustrating a flowchart of example main processing in an INTERVAL mode, executed by a control unit of an inductive heating apparatus according to one embodiment of the present disclosure.

FIG. 11 is a flowchart of example processing (main processing) 1100 executed mainly by the control unit 118 when in the INTERVAL mode. The main processing 1100 can be started in response to the control unit 118 transitioning to the INTERVAL mode.

S1110 is a step of performing control to stop the supply of the heating AC power to the RLC series circuit. Stopping the supply of the heating AC power can be realized by turning the switch $Q_1$ off, stopping the switching of the switch $Q_3$ and turning the switch $Q_3$ off, or both. It should be noted that the switch $Q_2$ may originally be off at the point in time of step S1110.

S1120 is a step of starting other processing (sub processing) to be executed in parallel with the main processing 1100. The sub processing started in this step will be described later.

S1130 is a step of performing control such that the non-heating AC power is supplied to the RLC series circuit and the impedance of the RLC series circuit is measured. This step may be similar to step S725 of the main processing 700 in the ACTIVE mode.

S1140 is a step of obtaining the susceptor temperature from the measured impedance. Note that step S1140 may be omitted by using a cooling target impedance corresponding to a cooling target temperature in step S1150 (described later) instead of the cooling target temperature. In this case, the impedance and the cooling target impedance are compared in step S1150.

S1150 is a step of determining whether the obtained susceptor temperature has reached a predetermined cooling target temperature. If the susceptor temperature is determined to have reached the cooling target temperature ("Yes" in S1150), the control unit 118 transitions to the HEAT mode, and if not ("No" in S1150), the processing returns to step S1130. Note that even if a predetermined time has passed after the start of the INTERVAL mode, a determination of "Yes" may be made in step S1150, assuming that the cooling is complete.

In the PRE-HEAT mode, the susceptor is heated rapidly to enable the aerosol to be delivered quickly. On the other hand, such rapid heating risks generating an excessive amount of aerosol. Accordingly, by executing the INTERVAL mode before the HEAT mode, the amount of aerosol generated can be stabilized from when the PRE-HEAT mode is complete to when the HEAT mode is complete. In other words, according to the main processing 1100, the preheated aerosol forming body 108 can be cooled before the HEAT mode in order to stabilize the generation of aerosol.

Figure 12:
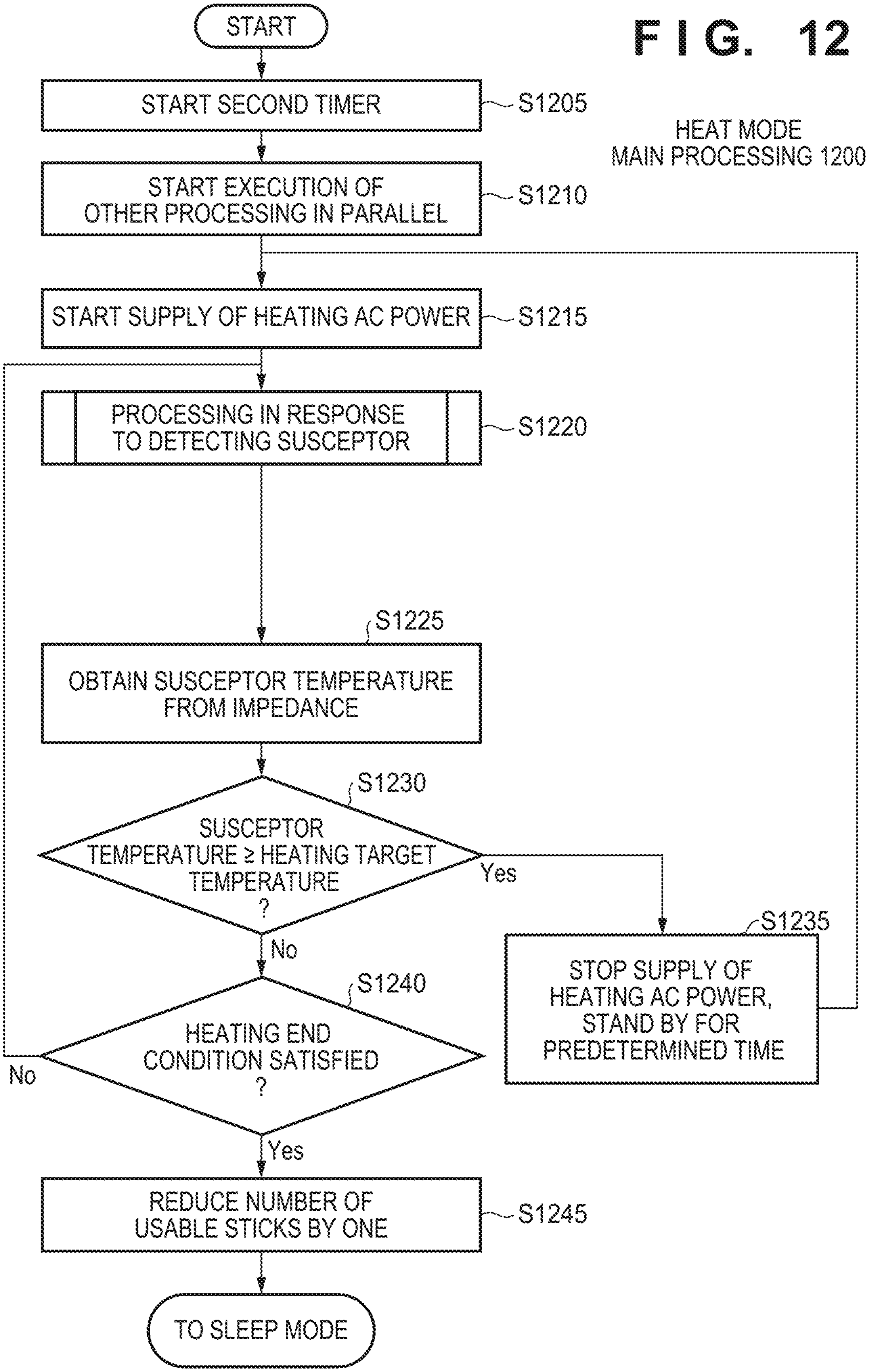
FIG. 12 is a diagram illustrating a flowchart of example main processing in a HEAT mode, executed by a control unit of an inductive heating apparatus according to one embodiment of the present disclosure.

FIG. 12 is a flowchart of example processing (main processing) 1200 executed mainly by the control unit 118 when in the HEAT mode. The main processing 1200 can be started in response to the control unit 118 transitioning to the HEAT mode.

S1205 is a step of starting the second timer.

S1210 is a step of starting other processing (sub processing) to be executed in parallel with the main processing 1200. The sub processing started in this step will be described later.

S1215 is a step of performing control to start the supply of the heating AC power to the RLC series circuit.

S1220 is a step of executing processing in accordance with the detection of the susceptor 110. Although this step will be described later, the step includes at least a step of measuring the impedance of the RLC series circuit.

S1225 is a step of obtaining the susceptor temperature from the impedance measured in step S1220. Note that step S1225 may be omitted by using a heating target impedance corresponding to a heating target temperature in step S1230 (described later) instead of the heating target temperature. In this case, the impedance and the heating target impedance are compared in step S1230.

S1230 is a step of determining whether the obtained susceptor temperature is at least a predetermined heating target temperature. If the susceptor temperature is at least the heating target temperature ("Yes" in S1230), the processing moves to step S1235, and if not ("No" in S1230), the processing moves to step S1240.

S1235 is a step of performing control to stop the supply of the heating AC power to the RLC series circuit and then standing by for a predetermined time. This step is intended to temporarily stop the supply of the heating AC power to the RLC series circuit and reduce the susceptor temperature that had become at least the heating target temperature.

S1240 is a step of determining whether a predetermined heating end condition has been met. Examples of the predetermined heating end condition are a condition that a predetermined time has passed, based on the value of the second timer; a condition that a predetermined number of suctions have been made using the aerosol forming body 108 currently in use; or an OR condition of these conditions. A method for sensing suction will be described later. If the heating end condition is determined to be satisfied ("Yes" in S1240), the processing moves to step S1245, and if not ("No" in S1240), the processing returns to step S1220.

S1245 is a step of reducing the usable number of sticks by one. After step S1245, the control unit 118 transitions to the SLEEP mode.

According to the main processing 1200, the susceptor temperature can be kept at a predetermined temperature to generate aerosol in a desired manner.

The following will describe processing performed in response to the susceptor 110 being detected, described above with in relation to the main processing 1000 of the PRE-HEAT mode and the main processing 1200 of the HEAT mode.

Figure 13A:
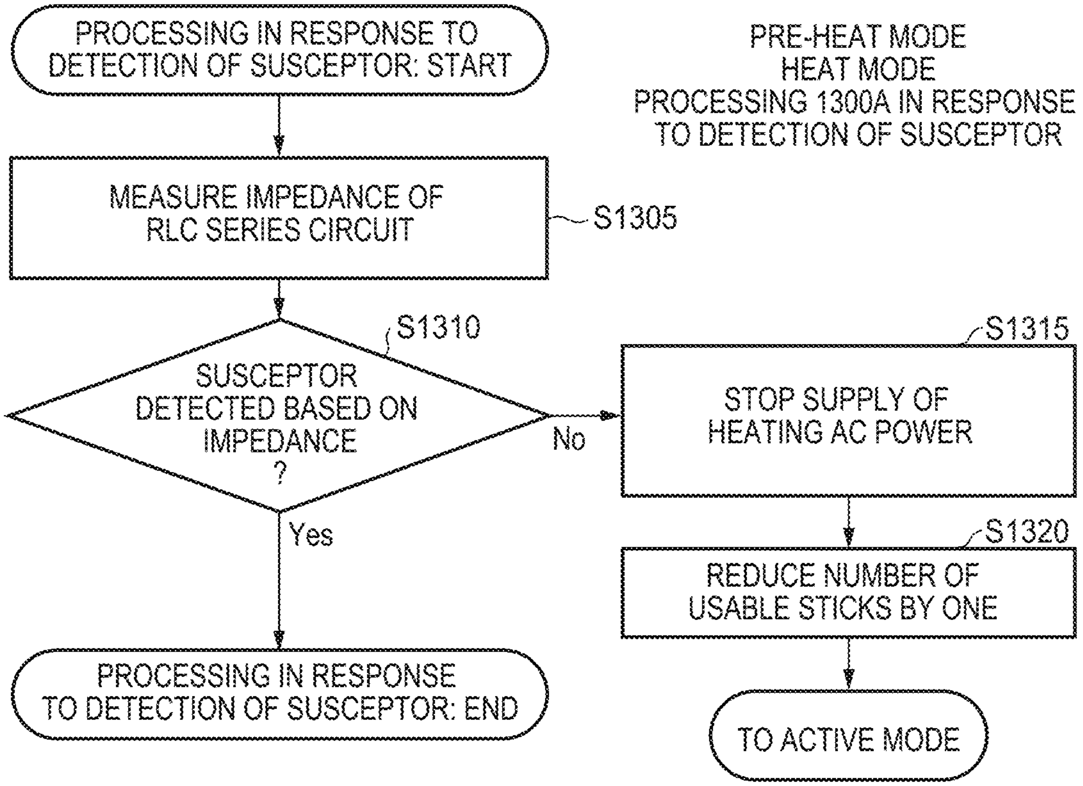
FIG. 13A is a diagram illustrating a flowchart of example processing performed in response to the detection of a susceptor, executed by a control unit of an inductive heating apparatus according to one embodiment of the present disclosure.

FIG. 13A is a flowchart of example processing 1300A performed in response to the susceptor 110 being detected.

S1305 is a step of measuring the impedance of the RLC series circuit. It should be noted that the supply of the heating AC power to the RLC series circuit has been started before step S1305.

S1310 is a step of determining whether the susceptor 110 has been detected based on the impedance measured. If the susceptor 110 is detected based on the impedance ("Yes" in S1310), the example processing 1300A ends and returns to the main processing 1000 or the main processing 1200, and if not ("No" in S1310), the processing moves to step S1315.

S1315 is a step of stopping the supply of the heating AC power to the RLC series circuit.

S1320 is a step of reducing the usable number of sticks by one. After step S1320, the control unit 118 transitions to the ACTIVE mode.

According to the example processing 1300A, when the aerosol forming body 108 is removed during inductive heating or the like, the inductive heating can be stopped. This makes it possible to improve the safety of the inductive heating apparatus 100 and reduce waste of the power stored in the power supply 102. Additionally, according to the example processing 1300A, the control unit 118 reduces the usable number of sticks by one when the aerosol forming body 108 is removed. As a result, it is more difficult for the voltage of the power supply 102 to reach the discharge end voltage or approach the discharge end voltage after the usable number of sticks are consumed than if the usable number of sticks is not reduced. Accordingly, accelerated degradation of the power supply 102 can also be suppressed.

Figure 13B:
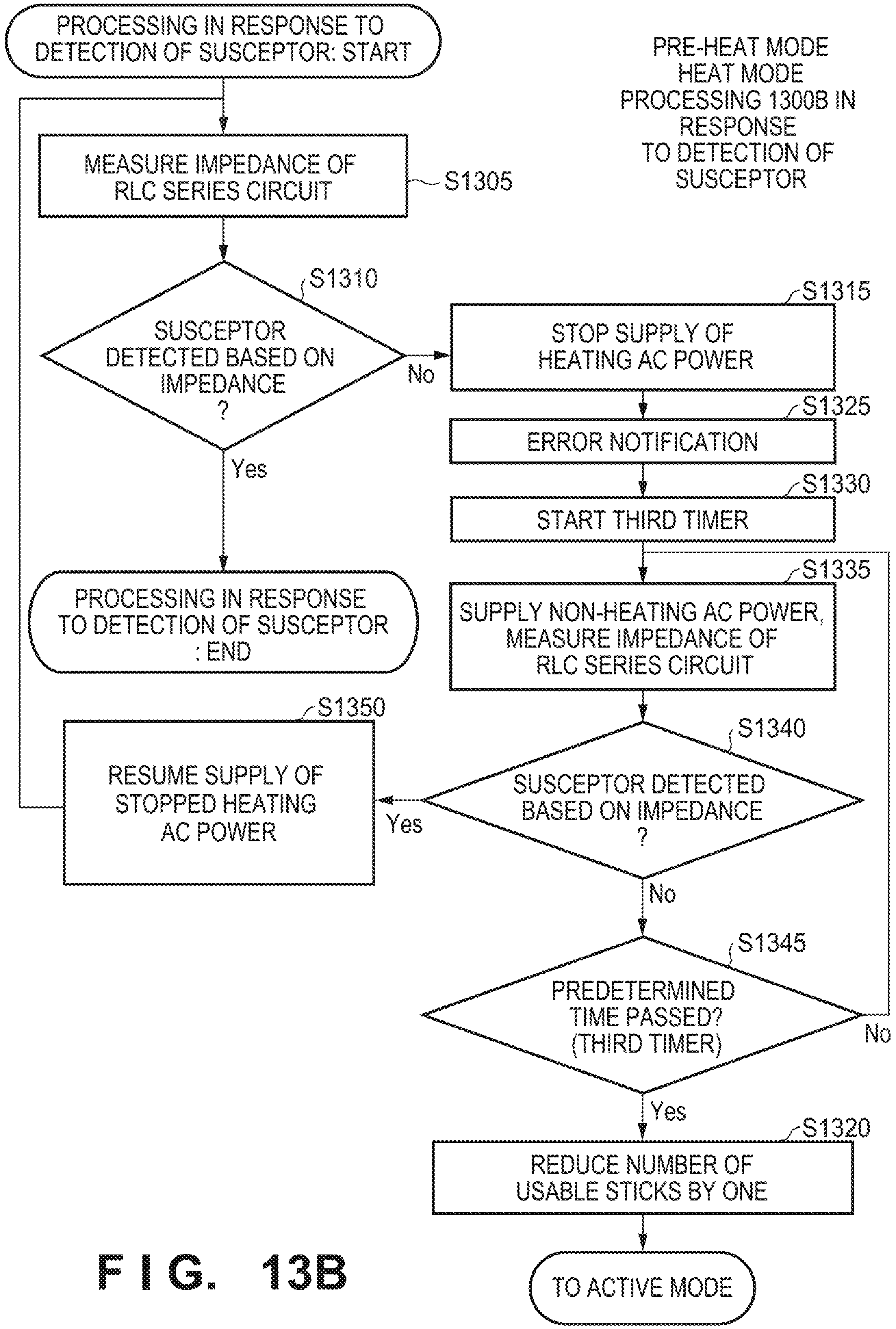
FIG. 13B is a diagram illustrating a flowchart of another example of processing performed in response to the detection of a susceptor, executed by a control unit of an inductive heating apparatus according to one embodiment of the present disclosure.

FIG. 13B is a flowchart of another example of processing 1300B performed in response to the susceptor 110 being detected. Some of the steps included in the example processing 1300B are the same as in the example processing 1300A, and thus the following will describe the differences.

In the example processing 1300B, the processing moves to step 1325 after step S1315.

S1325 is a step of making a predetermined error notification to the user. The predetermined error notification corresponds to a failure to detect the susceptor 110 during inductive heating due to the aerosol forming body 108 being accidentally removed or the like. The predetermined error notification may be made using the LED 138 or the like.

S1330 is a step of starting the third timer.

S1335 is a step of performing control such that the non-heating AC power is supplied to the RLC series circuit and the impedance of the RLC series circuit is measured. This step may be similar to step S725 of the main processing 700 in the ACTIVE mode.

S1340 is a step of determining whether the susceptor 110 has been detected based on the impedance measured. If the susceptor 110 is determined to be detected based on the impedance ("Yes" in S1340), the processing moves to step S1350, and if not ("No" in S1340), the processing moves to step S1345.

S1350 is a step of restarting the supply of the heating AC power to the RLC series circuit, which had been stopped in step S1315.

S1345 is a step of determining whether a predetermined time has passed based on the value of the third timer. If the predetermined time is determined to have passed ("Yes" in S1345), the processing moves to step S1320, and if not ("No" in S1345), the processing returns to step S1335.

Figure 14:
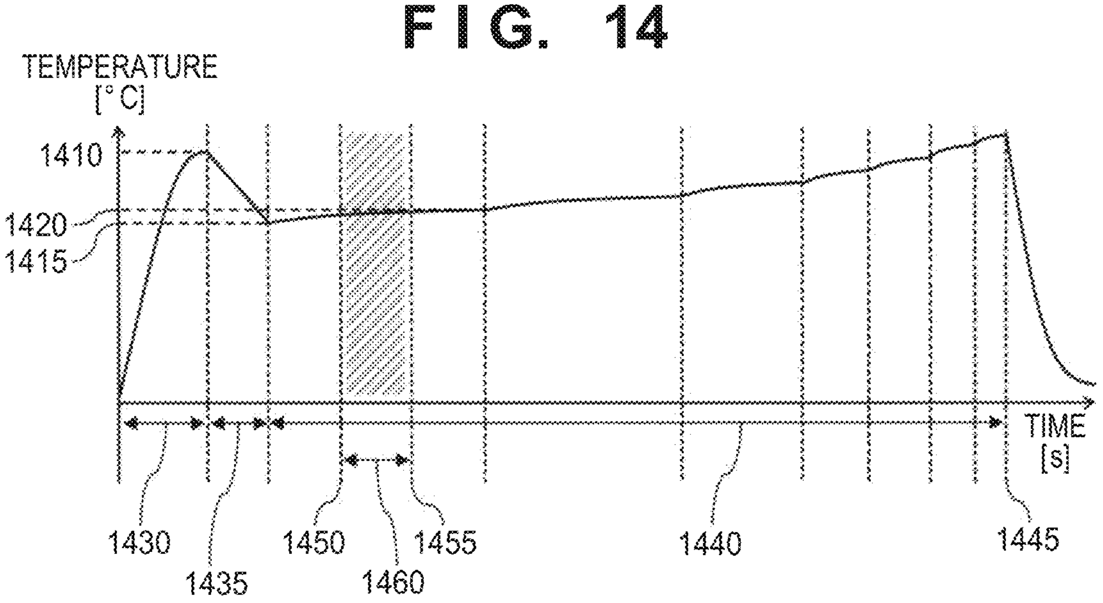
FIG. 14 is a diagram illustrating a graph expressing an example of changes in a susceptor temperature of an inductive heating apparatus according to one embodiment of the present disclosure.

The example processing 1300B will be described further with reference to FIG. 14. FIG. 14 is a graph expressing changes in the susceptor temperature. In this graph, the vertical axis corresponds to temperature, and the horizontal axis corresponds to time.

1410 indicates the predetermined pre-heat target temperature described above in relation to the main processing 700 of the PRE-HEAT mode.

1415 indicates the predetermined cooling target temperature described above in relation to the main processing 1100 of the INTERVAL mode.

1420 indicates the predetermined heating target temperature described above in relation to the main processing 1200 of the HEAT mode. Note that as will be described later, the HEAT mode has a heating profile including a plurality of phases in which different heating target temperatures are applied. 1420 indicates, in more detail, the heating target temperature in the first phase of the heating profile of the HEAT mode.

1430 indicates the period of the PRE-HEAT mode. In other words, the period of the PRE-HEAT mode ends roughly when the susceptor temperature reaches the predetermined pre-heat target temperature 1410.

1435 indicates the period of the INTERVAL mode. In other words, the period of the INTERVAL mode starts roughly when the susceptor temperature reaches the predetermined pre-heat target temperature 1410 and ends when the susceptor temperature reaches the cooling target temperature 1415.

1440 indicates the period of the HEAT mode. In other words, the period of the HEAT mode starts roughly when the susceptor temperature reaches the cooling target temperature 1415 and ends at a point in time 1445. 1445 indicates when the heating end condition is satisfied (step S1240 of the main processing 1200).

1450 indicates when the susceptor 110 can no longer be detected, i.e., when, in step S1310 of the example processing 1300B, the susceptor 110 cannot be determined to be detected based on the impedance ("No" in step S1310). 1455 indicates when the susceptor 110 can be detected again, i.e., when, in step S1340 of the example processing 1300B, the susceptor 110 can be determined to be detected based on the impedance ("Yes" in step S1340). S1460 indicates a period during which the susceptor 110 cannot be detected.

According to the example processing 1300B, although following a heating profile in which at least the heating target temperature according to the elapsation of time is defined, the inductive heating can be controlled assuming that time has also passed between step S1315, which is when the processing for inductive heating is stopped, and step S1350, which is when the processing for inductive heating is restarted. As such, the heating profile corresponding to the period S1460, when the susceptor 110 could not be detected, can essentially be skipped.

Figure 13C:
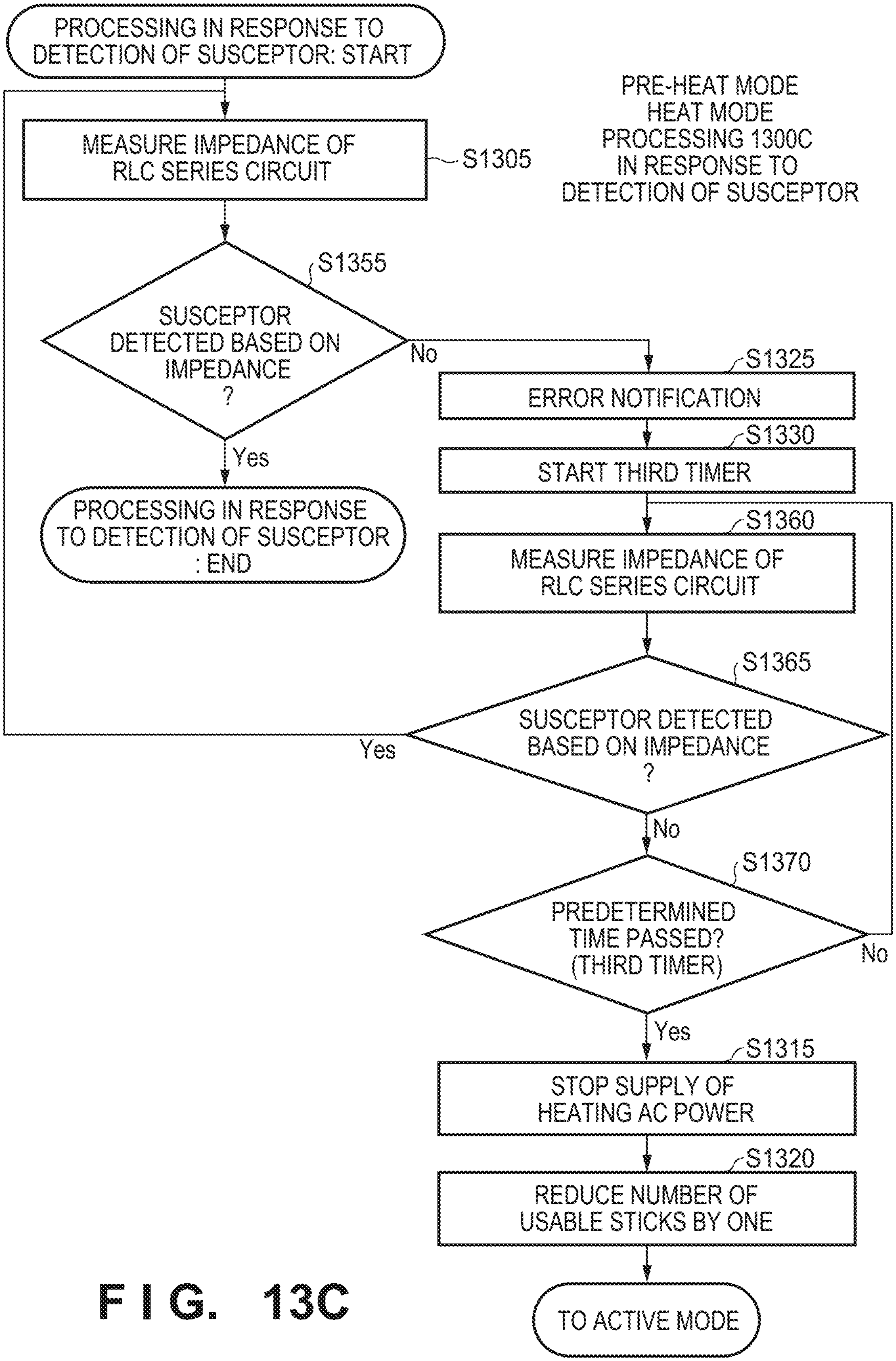
FIG. 13C is a diagram illustrating a flowchart of yet another example of processing performed in response to the detection of a susceptor, executed by a control unit of an inductive heating apparatus according to one embodiment of the present disclosure.

FIG. 13C is a flowchart of yet another example processing 1300C performed in response to the susceptor 110 being detected. Some of the steps included in the example processing 1300C are the same as in the example processing 1300A or 1300B, and thus the following will describe the differences.

S1355 is a step of detecting the susceptor 110 based on the impedance measured. This step is similar to step S1310, but differs in that the processing moves to step S1325 if the susceptor 110 cannot be determined to have been detected ("No" in S1355).

In the example processing 1300C, the processing moves to step S1360 after step S1330.

S1360 is a step of measuring the impedance of the RLC series circuit. Step S1360 is similar to step S1335, but in step S1360, it is not necessary to control the non-heating AC power to be supplied to the RLC series circuit. This is because at the point in time of step S1360, the supply of the heating AC power to the RLC series circuit is not stopped.

S1365 is a step of determining whether the susceptor 110 has been detected based on the impedance measured. This step is similar to step S1340, but differs in that if the susceptor 110 is determined to have been detected based on the impedance ("Yes" in S1365), the processing returns to step S1305, and if not ("No" in S1365), the processing moves to step S1370.

S1370 is a step of determining whether a predetermined time has passed based on the value of the third timer. This step is similar to step S1345, but differs in that if the predetermined time is determined to have passed ("Yes" in S1370), the processing moves to step S1315, and if not ("No" in S1370), the processing returns to step S1360.

The example processing 1300C will be described further with reference to FIG. 14. Note that the differences from the foregoing descriptions of the example processing 1300B will be described here.

1450 indicates when the susceptor 110 can no longer be detected, i.e., when, in step S1355 of the example processing 1300C, the susceptor 110 cannot be determined to be detected based on the impedance ("No" in step S1355). 1455 indicates when the susceptor 110 can be detected again, i.e., when, in step S1365 of the example processing 1300C, the susceptor 110 can be determined to be detected based on the impedance ("Yes" in step S1365).

As described above, the HEAT mode has a heating profile including a plurality of phases in which different heating target temperatures are applied. Additionally, processing of changing the heating target temperature at one or more timings (e.g., step S2115 in FIG. 21, described later) can be included in the processing of the HEAT mode. Then, according to the example processing 1300C, the period S1460 in which the susceptor 110 cannot be detected does not affect the stated one or more timings. This is because the example processing 1300C does not have step S1315 and step S1350 of the example processing 1300B. In other words, according to the example processing 1300C, the period S1460 in which the susceptor 110 cannot be detected can be made not to affect the overall length of the heating profile.

Figure 13D:
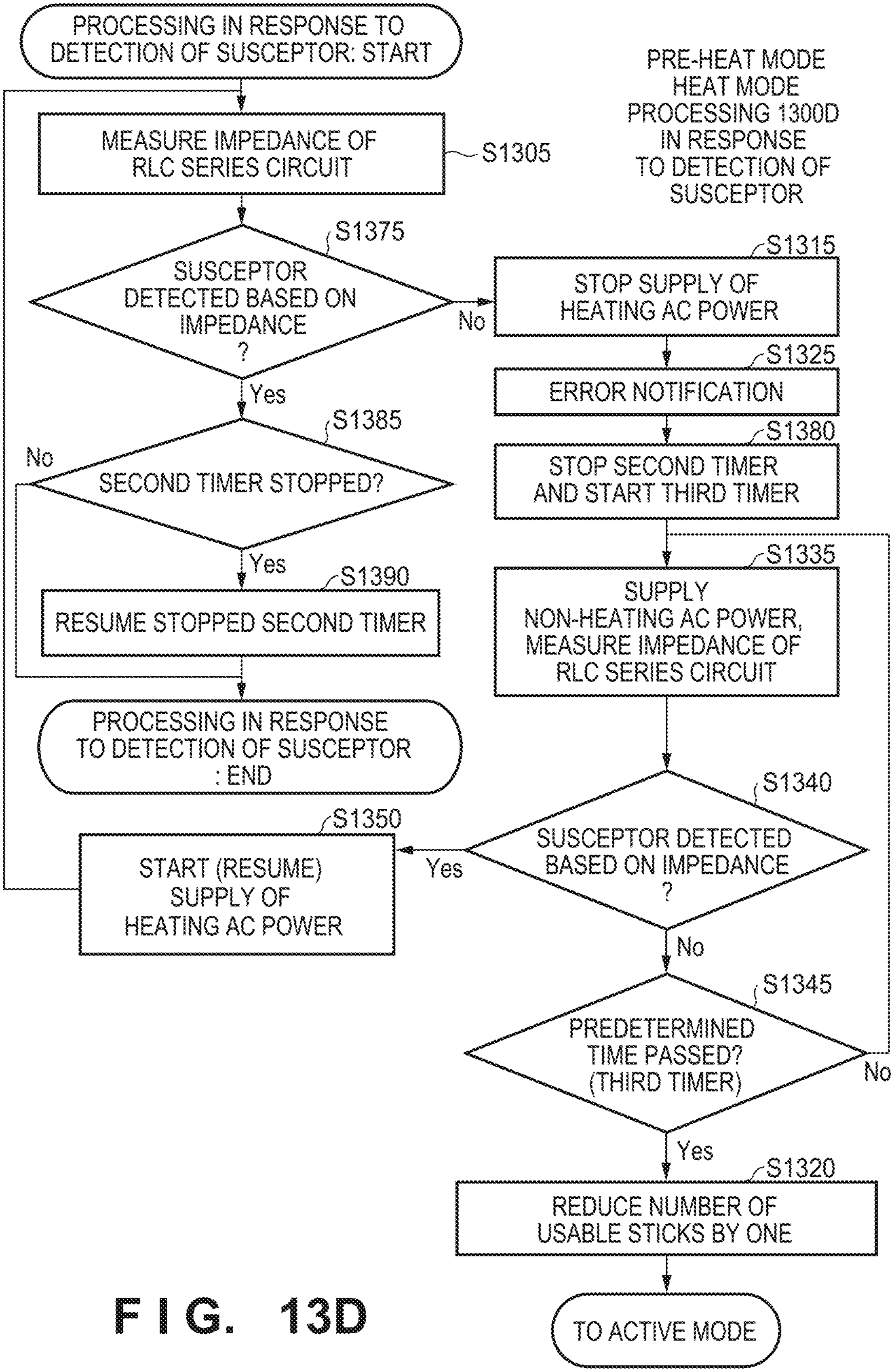
FIG. 13D is a diagram illustrating a flowchart of still another example of processing performed in response to the detection of a susceptor, executed by a control unit of an inductive heating apparatus according to one embodiment of the present disclosure.

FIG. 13D is a flowchart of yet another example of processing 1300D performed in response to the susceptor 110 being detected.

Some of the steps included in the example processing 1300D are the same as in the example processing 1300A, 1300B, or 1300C, and thus the following will describe the differences.

S1375 is a step similar to step S1310, but differs in that if the susceptor 110 is determined to have been detected based on the impedance, the processing moves to step S1385.

In the example processing 1300D, the processing moves to step S1380 after step S1325.

S1380 is a step of stopping the second timer that had been started and starting the third timer. Stopping the second timer ensures the value of the second timer does not increase as time passes. In other words, the progress of the heating profile is interrupted.

S1385 is a step of determining whether the second timer has stopped. This step may be a step of determining whether step S1380 has been executed. If the second timer is determined to have been stopped ("Yes" in S1385), the processing moves to step S1390, and if not ("No" in S1385), the example processing 1300D is ended and the processing returns to the main processing 1000 or the main processing 1200.

S1390 is a step of restarting the stopped second timer. By restarting the second timer, the value of the second timer increases over time again from the value at which the second timer was stopped. In other words, the progress of the heating profile is resumed.

The example processing 1300D will be described further with reference to FIG. 14. Note that the differences from the foregoing descriptions of the example processing 1300B will be described here.

1450 indicates when the susceptor 110 can no longer be detected, i.e., when, in step S1375 of the example processing 1300D, the susceptor 110 cannot be determined to be detected based on the impedance ("No" in step S1375).

In other words, according to the example processing 1300D, although following a heating profile in which at least the heating target temperature according to the elapsation of time is defined, the inductive heating can be controlled assuming that time has not passed between step S1315, which is when the processing for inductive heating is stopped, and step S1350, which is when the processing for inductive heating is restarted. As a result, the progress of the heating profile can substantially be interrupted.

Figure 13E:
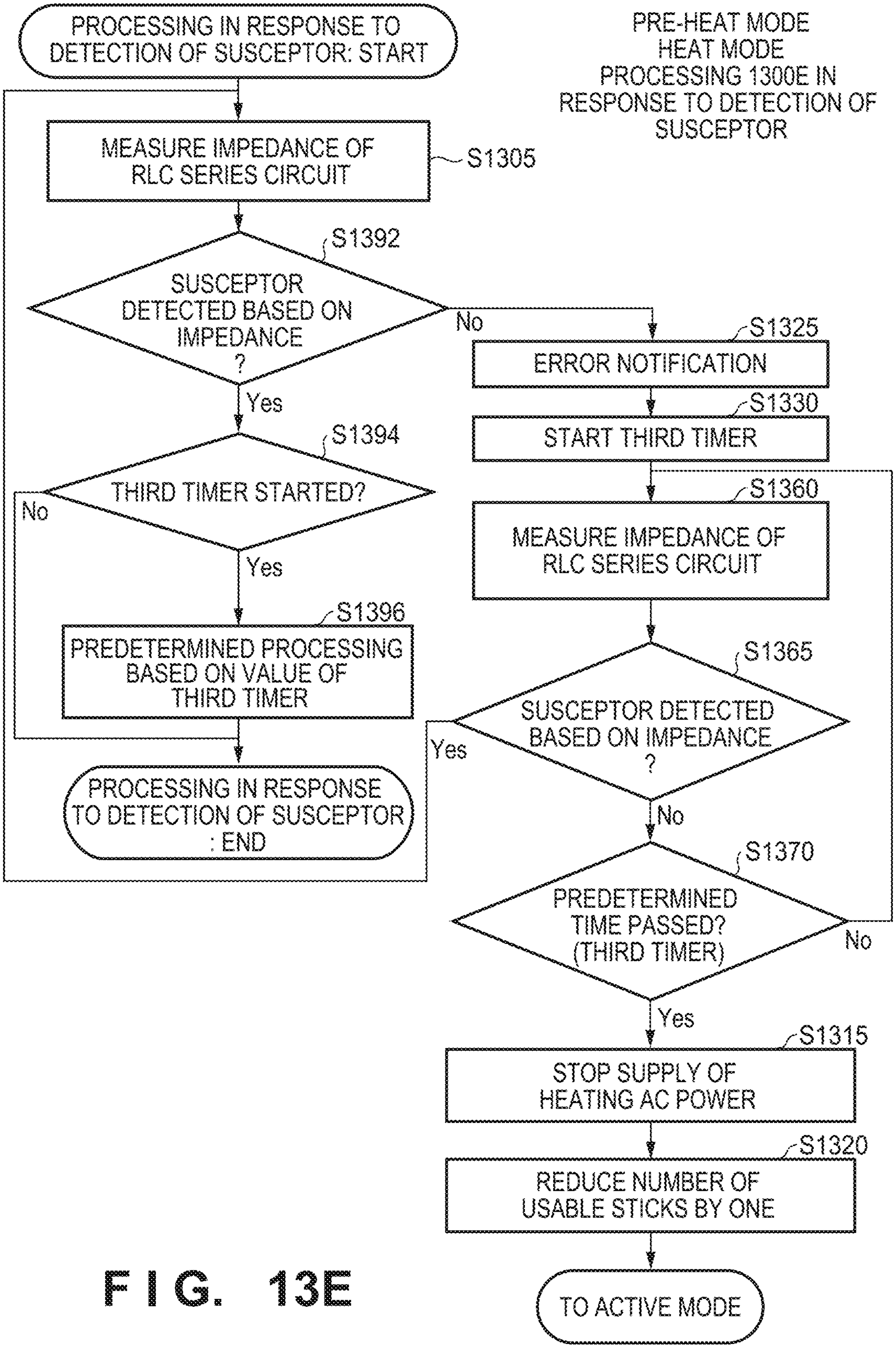
FIG. 13E is a diagram illustrating a flowchart of still another example of processing performed in response to the detection of a susceptor, executed by a control unit of an inductive heating apparatus according to one embodiment of the present disclosure.

FIG. 13E is a flowchart of yet another example processing 1300E performed in response to the susceptor 110 being detected. Some of the steps included in the example processing 1300E are the same as in the example processing 1300A, 1300B, 1300C, or 1300D, and thus the following will describe the differences.

S1392 is a step similar to step S1310, but differs in that if the susceptor 110 is determined to have been detected based on the impedance, the processing moves to step S1394.

S1394 is a step of determining whether the third timer has been started. This step may be a step of determining whether step S1330 has been executed. If the third timer is determined to have been started ("Yes" in S1394), the processing moves to step S1396, and if not ("No" in S1394), the example processing 1300E is ended and the processing returns to the main processing 1000 or the main processing 1200.

S1396 is a step of executing predetermined processing based on the value of the third timer. This predetermined processing may be processing that extends one of the plurality of phases included in the HEAT mode by the value of the third timer, i.e., the length of the period for which the susceptor 110 could not be detected. In other words, this predetermined processing may be processing that delays at least one of the one or more timings for changing the heating target temperature by the length of the period for which the susceptor 110 could not be detected. This can be realized, for example, by delaying the timing at which the determination to change is made in step S2105 of FIG. 21, which will be described later. Note that the delay of the phase and/or the delay of the timing for changing the heating target temperature does not absolutely have to be performed for the length of the period for which the susceptor 110 could not be detected. The phase may be delayed or the timing for changing the heating target temperature may be delayed by a value obtained by performing an operation such as adding or subtracting a predetermined value to or from the length of the period for which the susceptor 110 could not be detected, a value unrelated to the length of the period for which the susceptor 110 could not be detected, or the like.

The example processing 1300E will be described further with reference to FIG. 14. Note that the differences from the foregoing descriptions of the example processing 1300C will be described here.

1450 indicates when the susceptor 110 can no longer be detected, i.e., when, in step S1392 of the example processing 1300E, the susceptor 110 cannot be determined to be detected based on the impedance ("No" in step S1392).

According to the example processing 1300E, the timing for changing the heating target temperature can be delayed based on the period 1460 from step S1392, which is when the aerosol forming body can no longer be detected, to step S1365, when the aerosol forming body is once again detected, and thus the phase of the heating profile can be compensated for or delayed. In other words, according to the example processing 1300E, the length of the heating profile can be extended based on the period 1460 for which the susceptor 110 could not be detected.

Figure 15:
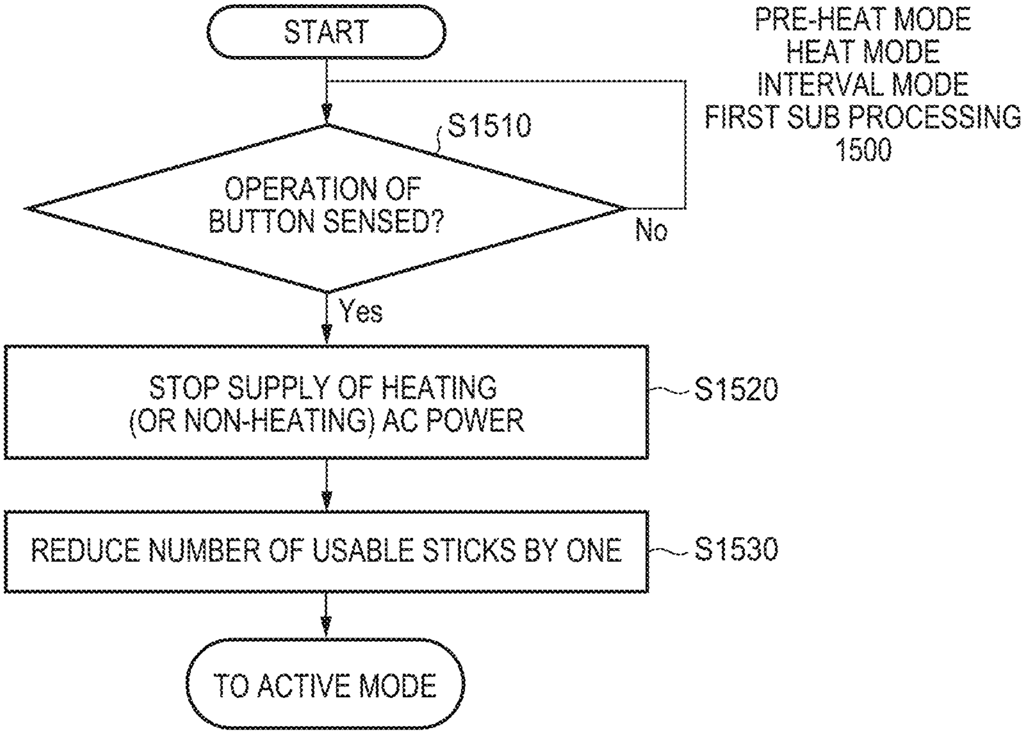
FIG. 15 is a diagram illustrating a flowchart of example sub processing in a PRE-HEAT mode, an INTERVAL mode, or a HEAT mode, executed by a control unit of an inductive heating apparatus according to one embodiment of the present disclosure.

FIG. 15 is a flowchart illustrating example first sub processing 1500, which is started in step S1020 of the main processing 1000 of the PRE-HEAT mode, step S1120 of the main processing 1100 of the INTERVAL mode, or step S1210 of the main processing 1200 of the HEAT mode.

S1510 is a step of determining whether a predetermined operation on the button 128 has been sensed. This predetermined operation may be the same as the predetermined operation in steps S420 and S810, or may be different. Note that a long press or a series of presses on the button 128 are examples of the predetermined operation in step S1510. If the predetermined operation on the button is determined to be detected ("Yes" in S1510), the processing moves to step S1520, and if not ("No" in S1510), the processing returns to S1510.

S1520 is a step of performing control to stop the supply of AC power. If the first sub processing 1500 is started in step S1020 or step S1210, this AC power is the heating AC power, whereas if the first sub processing 1500 is started in step S1120, this AC power is the non-heating AC power.

S1530 is a step of reducing the usable number of sticks by one. According to the sub processing 1500, when the supply of AC power is stopped by a user operation, the control unit 118 reduces the usable number of sticks by one. As a result, it is more difficult for the voltage of the power supply 102 to reach the discharge end voltage or approach the discharge end voltage after the usable number of sticks of the aerosol forming bodies 108 are consumed than if the usable number of sticks is not reduced. Accordingly, accelerated degradation of the power supply 102 can also be suppressed.

FIG. 16 is a flowchart illustrating example second sub processing 1600, which is started in step S1020 of the main processing 1000 of the PRE-HEAT mode, step S1120 of the main processing 1100 of the INTERVAL mode, or step S1210 of the main processing 1200 of the HEAT mode.

S1610 is a step of measuring discharge current. The discharge current can be measured by the current sensing circuit 136.

S1620 is a step of determining whether the measured discharge current is excessive. If the discharge current is determined to be excessive ("Yes" is S1620), the processing moves to step S1630, and if not ("No" in S1620), the processing returns to step S1610.

S1630 is a step of executing a predetermined fail-safe action.

S1640 is a step of making a predetermined error notification to the user. This predetermined error notification corresponds to the discharge current being excessive. After step S1640, the control unit 118 transitions to the ERROR mode. The error notification may be made using the LED 138.

FIG. 17 is a diagram illustrating the principle of detecting the susceptor 110, which is at least part of the aerosol forming body 108, based on the impedance, and the principle of obtaining the temperature of the susceptor 110, which is at least part of the aerosol forming body 108, based on the impedance.

1710 indicates an equivalent circuit of the RLC series circuit when the aerosol forming body 108 is not inserted into the inductive heating apparatus 100.

L represents the value of the inductance of the RLC series circuit. Although L is, strictly speaking, a composite value of the inductance components of a plurality of elements included in the RLC series circuit, L may be equal to the value of the inductance of the coil 106.

$C_2$ represents the value of the capacitance of the RLC series circuit. Although $C_2$ is, strictly speaking, a composite value of the capacitance components of a plurality of elements included in the RLC series circuit, $C_2$ may be equal to the value of the capacitance of the capacitor $C_2$.

$R_{Circuit}$ represents the resistance value of the RLC series circuit. $R_{Circuit}$ is a composite value of the resistance components of a plurality of elements included in the RLC series circuit.

The values of L, $C_2$, and $R_{Circuit}$ can be obtained in advance from the spec sheet of the electronic device or measured experimentally in advance, and stored in advance in a memory (not shown) of the control unit 118.

An impedance $Z_0$ of the RLC series circuit when the aerosol forming body 108 is not inserted into the inductive heating apparatus 100 can be calculated through the following formula.

$$Z_0 = \sqrt{R_{circuit}^2 + \left(\omega L - \frac{1}{\omega C_2}\right)^2} \quad \text{[Math 1]}$$

Here, ω represents an angular frequency of the AC power supplied to the RLC series circuit (ω=2πf; f is the frequency of the AC power).

On the other hand, 1720 indicates an equivalent circuit of the RLC series circuit when the aerosol forming body 108 is inserted into the inductive heating apparatus 100. 1720 is different from 1710 in terms of the presence of a resistance component of the susceptor 110 ($R_{susceptor}$), which is at least part of the aerosol forming body 108. An impedance $Z_1$ of the RLC series circuit when the aerosol forming body 108 is inserted into the inductive heating apparatus 100 can be calculated through the following formula.

$$Z_1 = \sqrt{(R_{circuit} + R_{susceptor})^2 + \left(\omega L - \frac{1}{\omega C_2}\right)^2} \quad \text{[Math 2]}$$

In other words, the impedance of the RLC series circuit when the aerosol forming body 108 is inserted into the inductive heating apparatus 100 is higher than when the aerosol forming body 108 is not inserted. The impedance $Z_0$ when the aerosol forming body 108 is not inserted into the inductive heating apparatus 100 and the impedance $Z_0$ when the aerosol forming body 108 is inserted are obtained experimentally in advance, and a threshold set therebetween is stored in the memory (not shown) of the control unit 118. This makes it possible to determine whether the aerosol forming body 108 is inserted into the inductive heating apparatus 100, i.e., whether the susceptor 110 is detected, based on whether the measured impedance Z is higher than the threshold. As described above, the detection of the susceptor 110 can be regarded as the detection of the aerosol forming body 108.

Note that the control unit 118 can calculate the impedance Z of the RLC series circuit based on the effective value $V_{RMS}$ of the voltage and the effective value $I_{RMS}$ of the current, respectively measured by the voltage sensing circuit 134 and the current sensing circuit 136.

$$Z = \frac{V_{RMS}}{I_{RMS}} \quad \text{[Math 3]}$$

Additionally, by solving the above formula of $Z_1$ for $R_{susceptor}$, the following formula is derived.

$$Z_1^2 = R_{susceptor}^2 + 2R_{susceptor} \cdot R_{circuit} + R_{circuit}^2 + \left(\omega L - \frac{1}{\omega C}\right)^2 \quad \text{[Math 4]}$$

$$R_{susceptor}^2 + 2R_{circuit} \cdot R_{susceptor} + R_{circuit}^2 + \left(\omega L - \frac{1}{\omega C}\right)^2 - Z_1^2 = 0$$

$$R_{susceptor} = \frac{-2R_{circuit} \pm \sqrt{4R_{circuit}^2 - 4\left(R_{circuit}^2 + \left(\omega L - \frac{1}{\omega C}\right)^2 - Z_1^2\right)}}{2}$$

$$= \pm\sqrt{Z_1^2 - \left(\omega L - \frac{1}{\omega C}\right)^2} - R_{circuit}$$

Here, when negative resistance values are excluded, and $Z_1$ is replaced with Z, the following is obtained.

$$R_{susceptor} = \sqrt{Z^2 - \left(\omega L - \frac{1}{\omega C}\right)^2} - R_{circuit} \quad \text{[Math 5]}$$

By experimentally obtaining the relationship between $R_{susceptor}$ and the susceptor temperature in advance and storing that relationship in the memory (not shown) of the control unit 118, the susceptor temperature can be obtained based on $R_{susceptor}$ further calculated from the impedance Z of the RLC series circuit.

Figure 18:
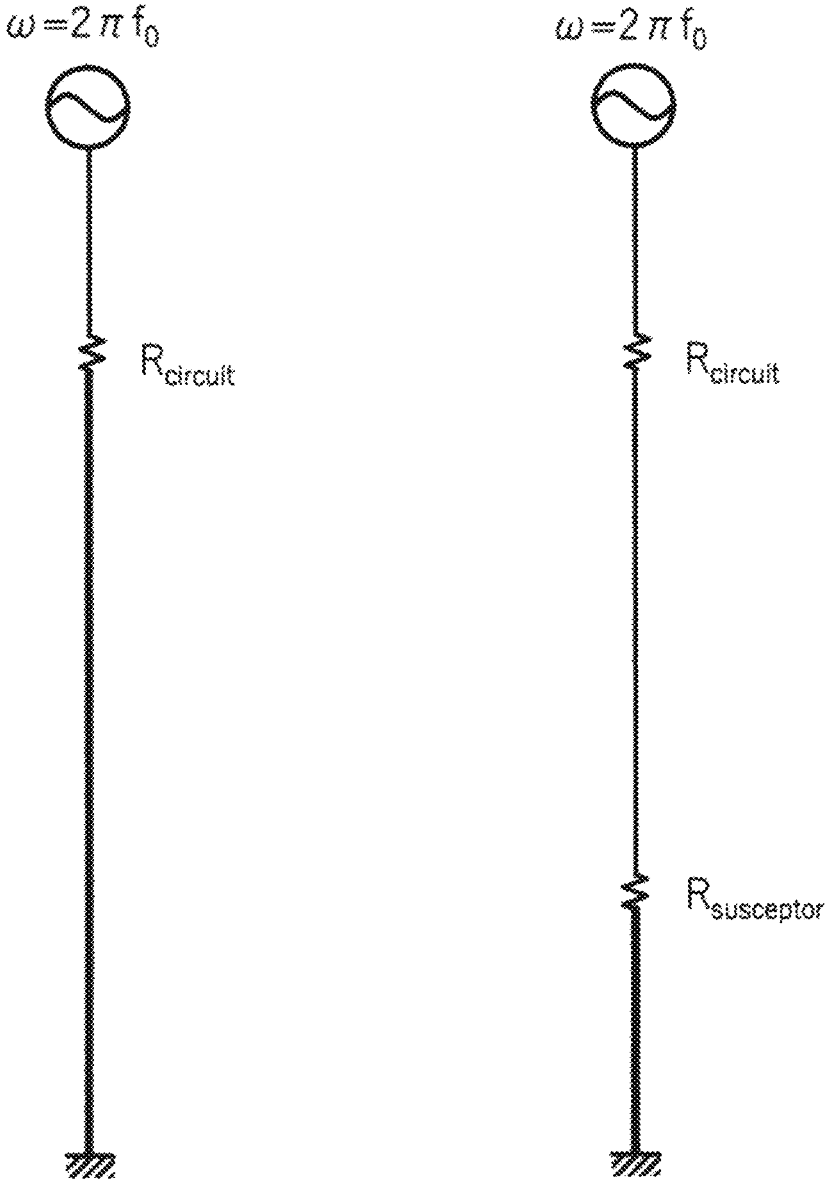
FIG. 18 is a diagram illustrating an equivalent circuit of an RLC series circuit at a resonance frequency.

FIG. 18 illustrates an equivalent circuit of the RLC series circuit when AC power is supplied at the resonance frequency $f_0$ of the RLC series circuit. 1810 and 1820 respectively indicate an equivalent circuit of the RLC series circuit when the aerosol forming body 108 is not inserted, and is inserted, into the inductive heating apparatus 100. The resonance frequency $f_0$ can be derived as follows.

$$f_0 = \frac{1}{2\pi\sqrt{LC_2}} \quad \text{[Math 6]}$$

Additionally, the following relationship is satisfied by the resonance frequency $f_0$, and thus the inductance component and the capacitance component of the RLC series circuit can be ignored with respect to the impedance of the RLC series circuit.

$$\omega L = \frac{1}{\omega C_2} \quad \text{[Math 7]}$$

Accordingly, the impedance $Z_0$ of the RLC series circuit when the aerosol forming body 108 is not inserted into the inductive heating apparatus 100, and the impedance $Z_1$ of the RLC series circuit when the aerosol forming body 108 is inserted, at the resonance frequency $f_0$, are as follows.

$$Z_0 = R_{circuit} \quad \text{[Math 8]}$$

$$Z_1 = R_{circuit} + R_{susceptor}$$

Additionally, the value $R_{susceptor}$ of the resistance component produced by the susceptor 110, which is at least part of the aerosol forming body 108, when the aerosol forming body 108 is inserted into the inductive heating apparatus 100, at the resonance frequency $f_0$, can be calculated through the following formula.

$$R_{susceptor} = Z - R_{circuit} \quad \text{[Math 9]}$$

In this manner, when detecting the susceptor 110, when obtaining the susceptor temperature based on the impedance, or both, using the resonance frequency $f_0$ of the RLC series circuit is advantageous in terms of the ease of calculations. Of course, using the resonance frequency $f_0$ of the RLC series circuit is also advantageous in terms of supplying the power stored in the power supply 102 to the susceptor 110 at high efficiency and high speed.

Specific Example 1 of Heating Profile

A specific example of the heating profile will be described hereinafter.

In the present example, the inductive heating apparatus 100 can appropriately heat the aerosol forming bodies 108 by changing the switching frequency of the alternating current generation circuit 132 in the PRE-HEAT mode, the INTERVAL mode, and the HEAT mode constituted by a plurality of phases.

Figure 19:
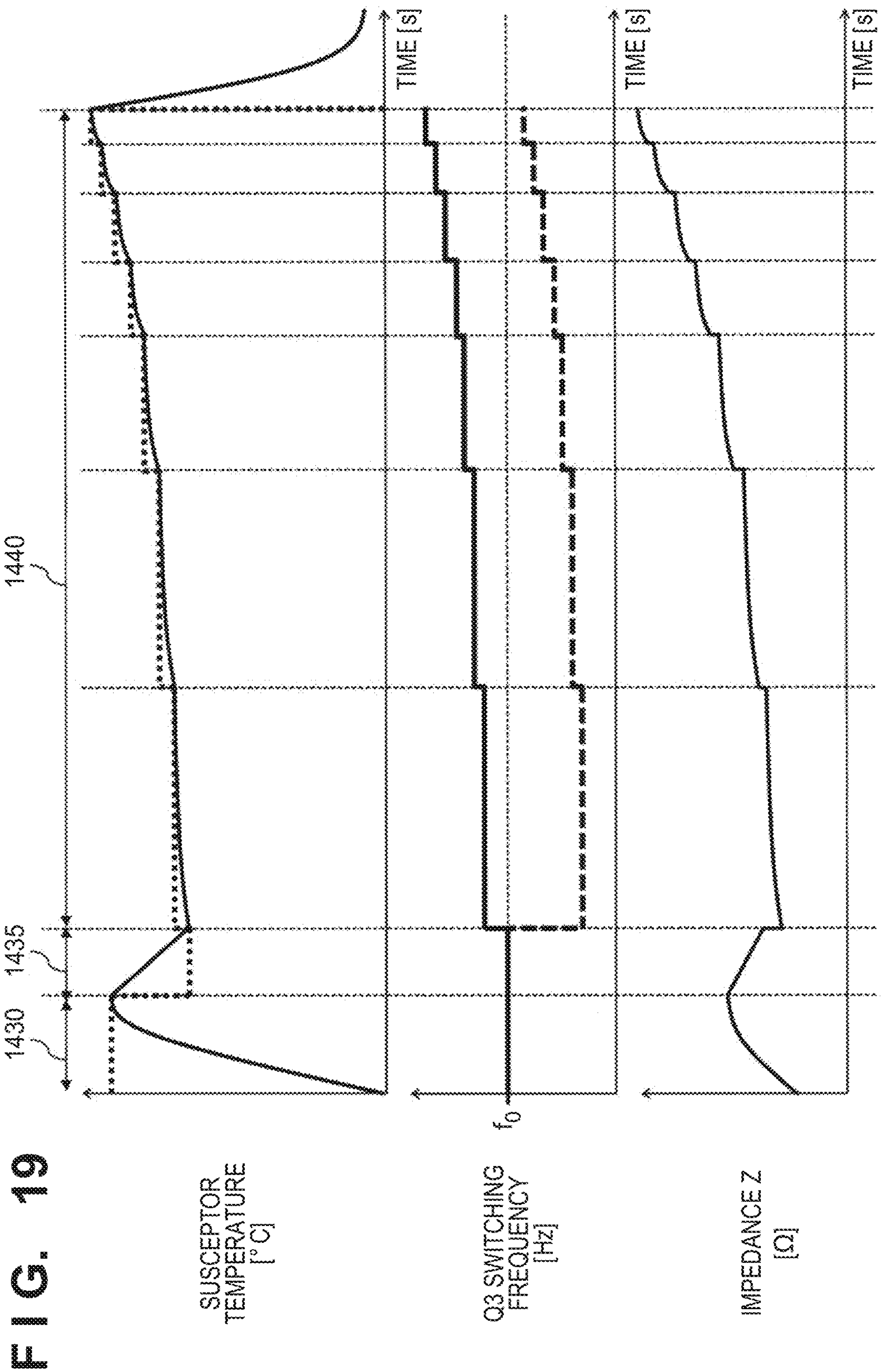
FIG. 19 is a diagram illustrating a graph expressing respective examples of changes in a temperature of a susceptor of an inductive heating apparatus, a switching frequency of an alternating current generation circuit, and changes in an impedance of a circuit, according to one embodiment of the present disclosure.

FIG. 19 is a diagram showing graphs (a), (b), and (c), which express changes in the temperature of the susceptor 110, the switching frequency of the alternating current generation circuit 132, and the impedance of the circuit 104, respectively, in the inductive heating apparatus 100 of the present example. Similar to FIG. 14, in FIG. 19, arrow 1430 indicates the period of the PRE-HEAT mode, arrow 1435 indicates the period of the INTERVAL mode, and arrow 1440 indicates the period of the HEAT mode. Additionally, in (a), the solid line graph represents the temperature of the susceptor 110, and the broken line graph represents the target temperature (pre-heat target temperature, cooling target temperature, and heating target temperature) in each period.

Although FIG. 19 illustrates the temperature of the susceptor 110 (or the susceptor temperature) reaching the heating target temperature as coinciding with a switch in the phase, this is because the drawing illustrates the ideal behavior. In other words, in terms of the example processing illustrated in FIG. 21 and described later, the behavior illustrated in FIG. 19 corresponds to a case where the timing at which the switching frequency of the switch $Q_3$ is changed coincides with the timing at which the temperature of the susceptor 110 first reaches the heating target temperature. Generally speaking, after reaching the heating target temperature, the temperature of the susceptor 110 repeats behavior of dropping due to the temporary stop in the heating AC power and then rising again. Accordingly, generally speaking, the temperature of the susceptor 110 reaching the heating target temperature does not coincide with a switch in the phase. The same applies to both FIG. 20 and FIG. 22.

As indicated in (b), in the present example, the switching frequency of the switch $Q_3$ of the alternating current generation circuit 132 is the resonance frequency $f_0$ in the period 1430 of the PRE-HEAT mode and the period 1435 of the INTERVAL mode, and is also constant in those periods. In the period 1440 of the HEAT mode, the switching frequency of the switch $Q_3$ is controlled to rise in steps as each phase progresses (the timing at which the switching frequency of the switch $Q_3$ rises is scheduled in advance; the same applies to Specific Example 2, described later). When the switching frequency of the switch $Q_3$ changes, so too does the impedance of the circuit 104. As a result of the switching frequency of the switch $Q_3$ rising in steps, the impedance of the circuit 104 also continues to increase, as indicated in (c). In the present example, a temporary temperature drop can be sensed when the user sucks the aerosol generated from the aerosol source 112 can be sensed from the change in the impedance of the circuit 104 (or the change in the AC current supplied to the coil 106). In other words, the user may be determined to have sucked aerosol when a drop in the temperature is detected.

Additionally, the switching frequency of the switch $Q_3$ in the period 1440 of the HEAT mode may be controlled to start from the resonance frequency $f_0$ and gradually move away from the resonance frequency $f_0$, as indicated by the solid line graph in (b), or may be controlled to drop significantly from the resonance frequency $f_0$ before gradually approaching the resonance frequency $f_0$, as indicated by the broken line graph in (b). In the former case, the switching frequency of the switch $Q_3$ increases in a frequency region higher than the resonance frequency as the plurality of phases constituting the HEAT mode 1440 progress, and in the latter case, the switching frequency of the switch $Q_3$ increases in a frequency region lower than the resonance frequency as the plurality of phases constituting the HEAT mode 1440 progress. Rapid heating is required only in the PRE-HEAT mode, and high-efficiency heating by inductive heating may not be suitable for the gradual rise in temperature in the HEAT mode. Accordingly, in the present example, the switching frequency of the switch $Q_3$ is removed from the resonance frequency $f_0$, which makes it possible to realize a gradual increase in temperature. The susceptor 110 can be heated appropriately by changing the frequency from phase to phase in this manner.

Figure 20:
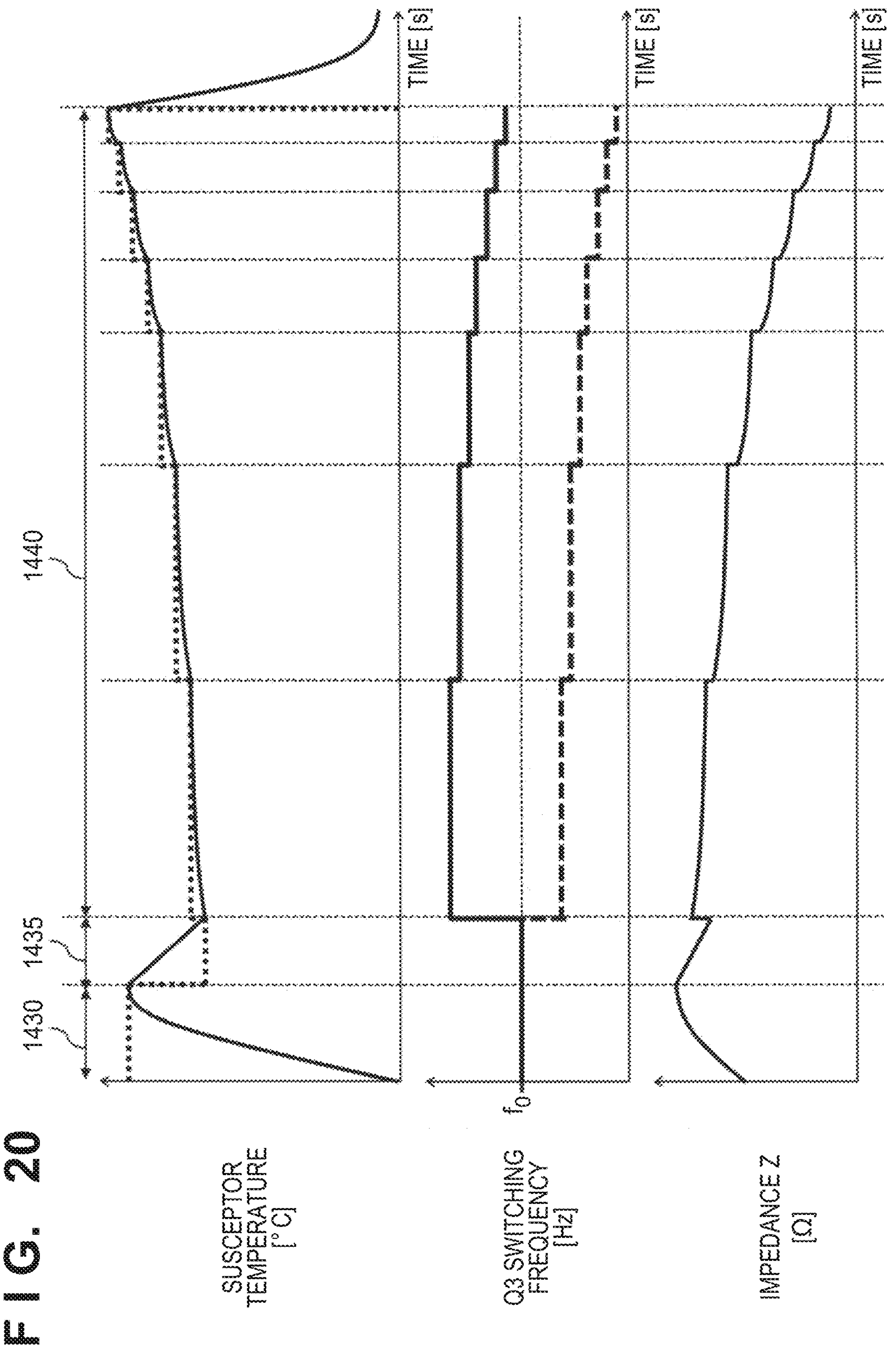
FIG. 20 is a diagram illustrating a graph expressing respective examples of changes in a temperature of a susceptor of an inductive heating apparatus, a switching frequency of an alternating current generation circuit, and changes in an impedance of a circuit, according to one embodiment of the present disclosure.

Additionally, FIG. 20 is a diagram showing another example of changes in the temperature of the susceptor 110, the switching frequency of the alternating current generation circuit 132, and the impedance of the circuit 104 in the inductive heating apparatus 100. In the present example too, the switching frequency of the switch $Q_3$ of the alternating current generation circuit 132 is the resonance frequency $f_0$ in the period 1430 of the PRE-HEAT mode and the period 1435 of the INTERVAL mode, and is also constant in these periods. However, in the period 1440 of the HEAT mode in the present example, the switching frequency of the switch $Q_3$ is controlled to drop in steps as each phase progresses. Additionally, as a result of the switching frequency of the switch $Q_3$ dropping in steps, the impedance of the circuit 104 also continues to decrease. When not sensing aerosol suction by the user, the switching frequency of the switch $Q_3$ may be controlled to drop as the phases in the HEAT mode progress, as in the present example, and a gradual rise in temperature can be realized as a result.

Additionally, the switching frequency of the switch $Q_3$ in the period 1440 of the HEAT mode may be controlled to rise significantly from the resonance frequency $f_0$ before gradually approaching the resonance frequency $f_0$, as indicated by the solid line graph in (b), or may be controlled to start from the resonance frequency $f_0$ and gradually move away from the resonance frequency $f_0$, as indicated by the broken line graph in (b). In the former case, the switching frequency of the switch $Q_3$ decreases in a frequency region higher than the resonance frequency as the plurality of phases constituting the HEAT mode progress, and in the latter case, the switching frequency of the switch $Q_3$ decreases in a frequency region lower than the resonance frequency as the plurality of phases constituting the HEAT mode progress.

Figure 21:
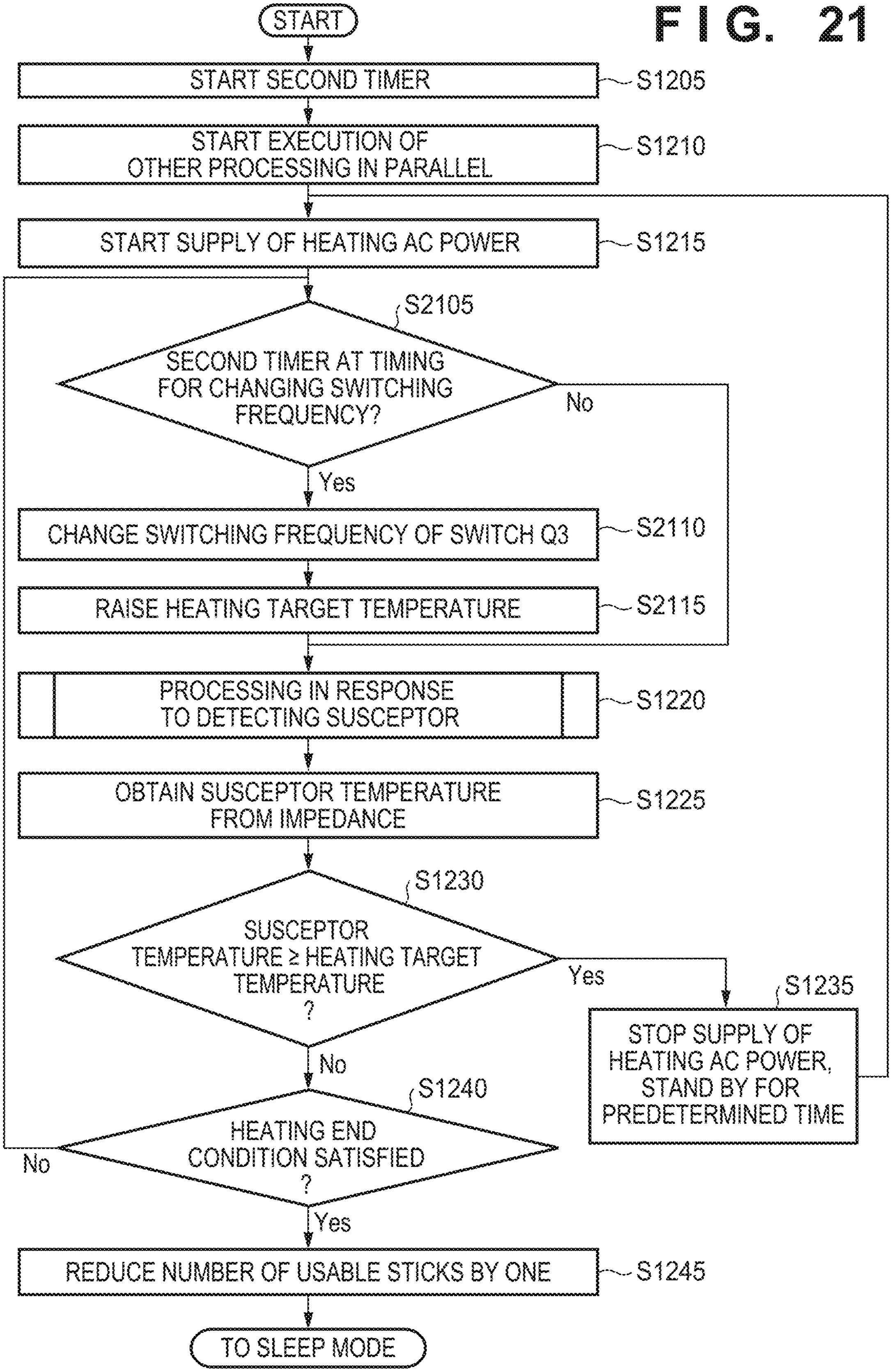
FIG. 21 is a diagram illustrating a flowchart of example processing executed by a control unit of an inductive heating apparatus, mainly when in a HEAT mode, according to one embodiment of the present disclosure.

FIG. 21 is a flowchart of example processing executed mainly by the control unit 118 when in the HEAT mode. The flowchart in FIG. 21 adds the processing of step S2105, step S2110, and step S2115 to the flowchart in FIG. 12. The other steps are the same as in FIG. 12 and will therefore not be described.

Step S2105 is a step of determining whether the second timer is at a timing for changing the switching frequency of the switch $Q_3$. If it is determined that it is the timing for changing the switching frequency of the switch $Q_3$ ("Yes" in step S2105), in step S2110, the switching frequency of the switch $Q_3$ is changed (increased or reduced). Then, in step S2115, the heating target temperature is increased by a predetermined value. If it is determined in step S2105 that it is not the timing for changing the switching frequency of the switch $Q_3$ ("No" in step S2105), the processing of step S2110 and step S2115 is skipped (i.e., the switching frequency of the switch $Q_3$ is not changed). Note that the processing of step S2110 and step S2115 may be executed in the reverse order, or may be executed in parallel.

Specific Example 2 of Heating Profile

Another specific example of the heating profile will be described hereinafter. In the present example, the switching frequency of the alternating current generation circuit 132 is fixed to a specific frequency without being changed in the PRE-HEAT mode, the INTERVAL mode, and the HEAT mode constituted by the plurality of phases, and in particular, in the present example, is fixed to the resonance frequency.

Figure 22:
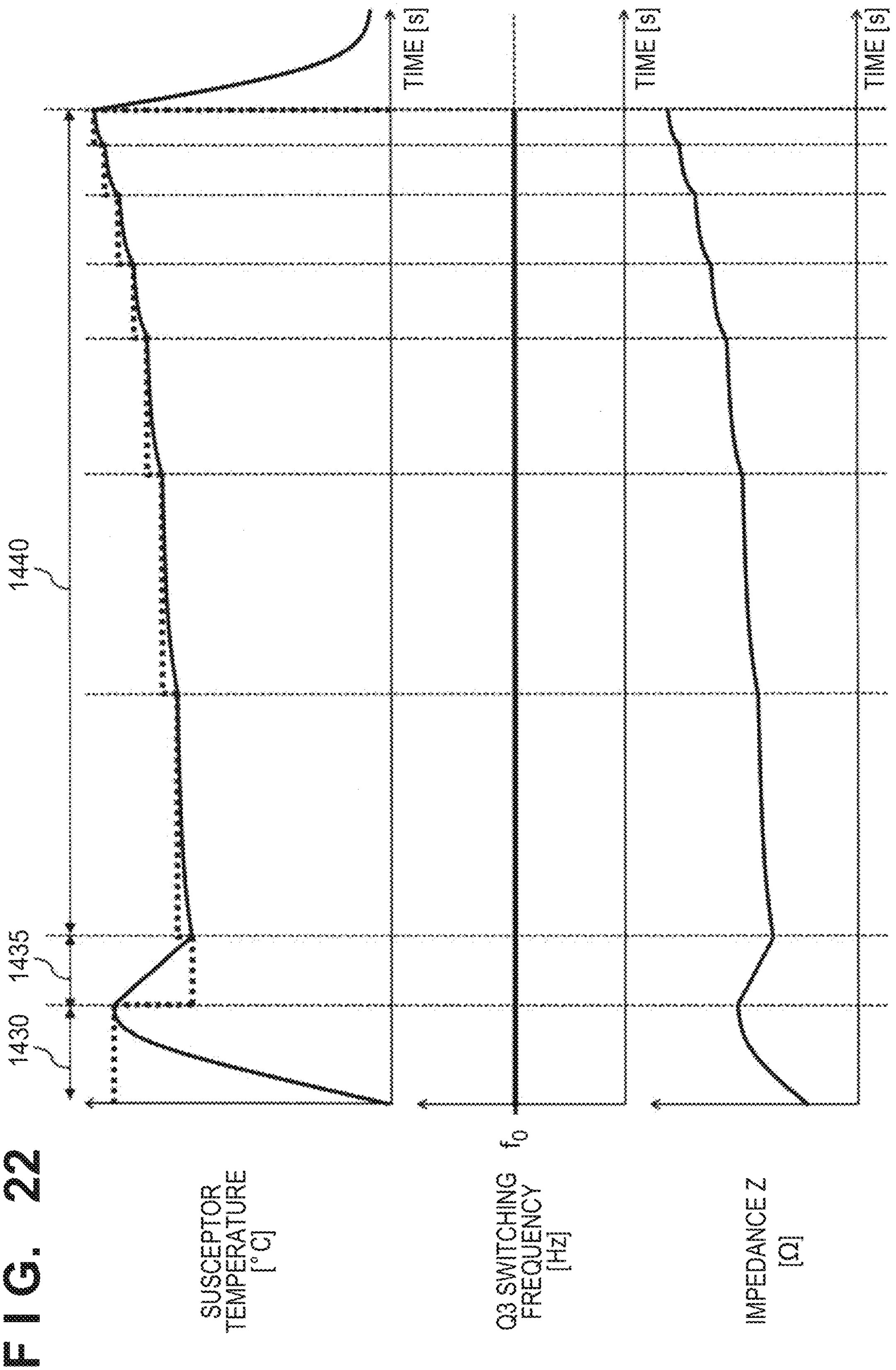
FIG. 22 is a diagram illustrating a graph expressing respective examples of changes in a temperature of a susceptor of an inductive heating apparatus, a switching frequency of an alternating current generation circuit, and changes in an impedance of a circuit, according to one embodiment of the present disclosure.

FIG. 22 is a diagram showing graphs (a), (b), and (c), which express changes in the temperature of the susceptor 110, the switching frequency of the alternating current generation circuit 132, and the impedance of the circuit 104, respectively, in the inductive heating apparatus 100 of the present example. As indicated in (b), in the present example, the switching frequency of the alternating current generation circuit 132 in the inductive heating apparatus 100 is fixed to the resonance frequency in the PRE-HEAT mode, the INTERVAL mode, and the HEAT mode constituted by the plurality of phases.

Figure 23:
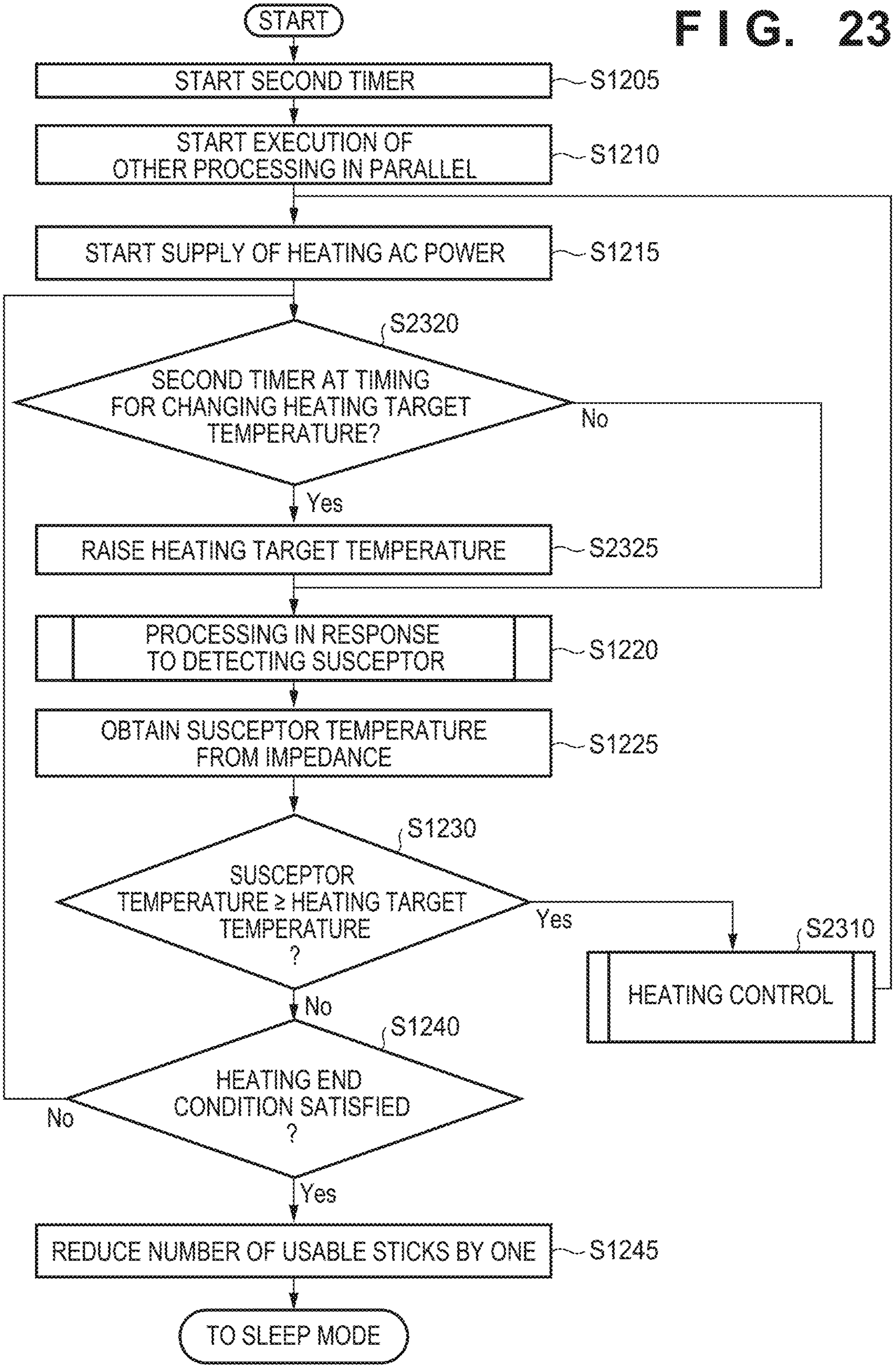
FIG. 23 is a diagram illustrating a flowchart of example processing executed by a control unit of an inductive heating apparatus, mainly when in a HEAT mode, according to one embodiment of the present disclosure.
Figure 24:
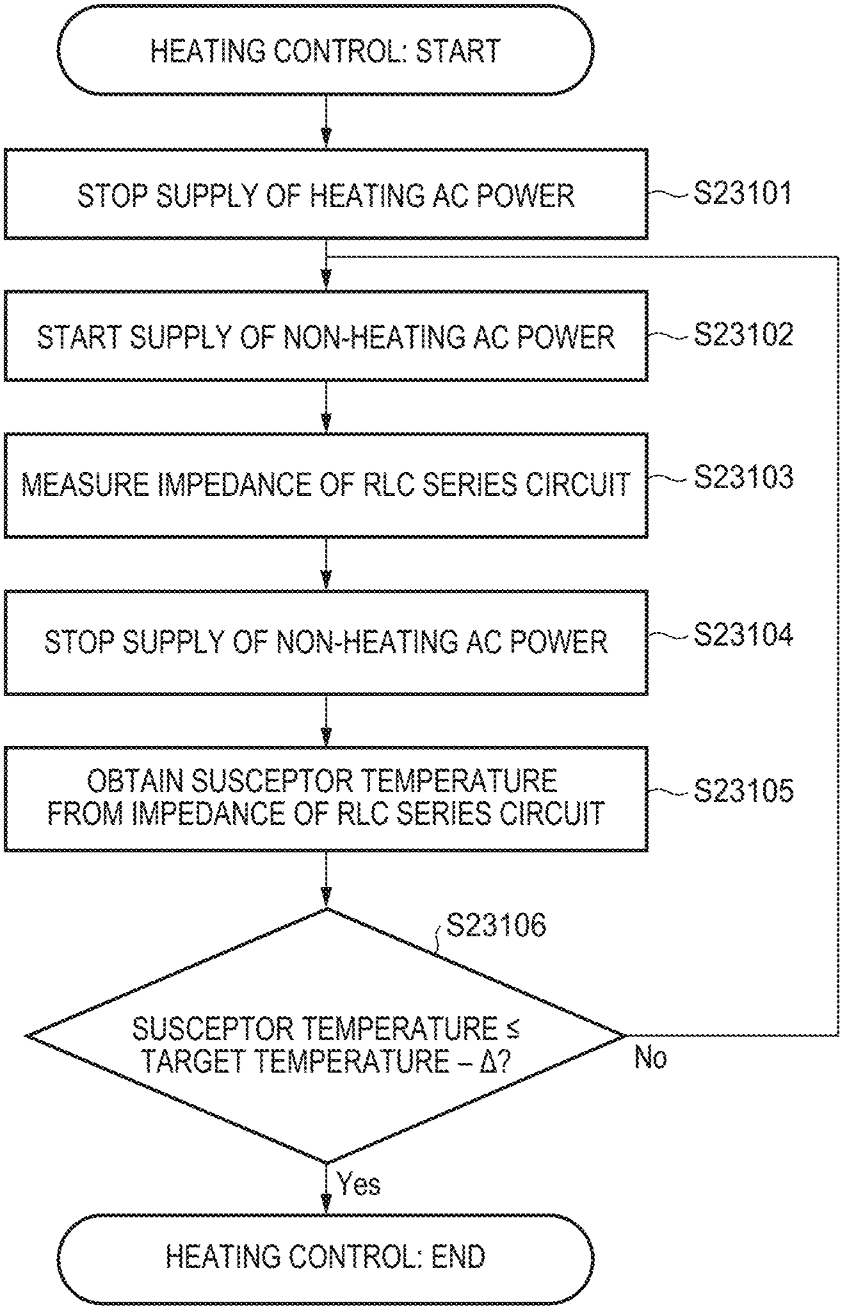
FIG. 24 is a flowchart illustrating an example of details of heating processing in step S2310.

FIG. 23 and FIG. 24 are flowcharts of example processing executed mainly by the control unit 118 when in the HEAT mode. The flowchart in FIG. 23 differs from FIG. 12 in that heating control in step S2310 is executed instead of step S1235, and that step S2320 and step S2325 are added. The other steps are the same as in FIG. 12 and will therefore not be described.

Step S2320 is a step of determining whether the second timer is at a timing for changing the heating target temperature. If it is determined that it is the timing for changing the heating target temperature ("Yes" in step S2320), in step S2325, the heating target temperature is increased by a predetermined value. If it is determined in step S2320 that it is not the timing for changing the heating target temperature ("No" in step S2320), the processing of step S2325 is skipped (i.e., the heating target temperature is not changed).

FIG. 24 is a flowchart illustrating an example of details of the heating control in step S2310. Step S23101 is a step of performing control to stop the supply of the heating AC power to the RLC series circuit. Step S23102 is a step of performing control such that the supply of the non-heating AC power to the RLC series circuit is started in order to measure the impedance of the RLC series circuit.

Step S23103 is a step of measuring the impedance of the RLC series circuit. Step S23104 is a step of performing control to stop the supply of the non-heating AC power to the RLC series circuit. Step S23105 is a step of obtaining the susceptor temperature from the impedance measured in step S23103. Note that the processing of steps S23101 to S23105 may be processing similar to that in the aforementioned flowchart. Additionally, step S23106 is a step of determining whether the susceptor temperature obtained in step S23105 is no greater than (predetermined heating target temperature−Δ). If the susceptor temperature is no greater than (predetermined heating target temperature−Δ), the heating control is ended, and the processing moves to step S1215 in FIG. 23. If the susceptor temperature is greater than (predetermined heating target temperature−Δ), the processing returns to step S23102. In other words, if the susceptor temperature is greater than (predetermined heating target temperature−Δ), the susceptor temperature continues to be monitored by the high-resistance second circuit including the switch $Q_2$. At this time, the switch $Q_3$ may be switched at a predetermined cycle even while the heating of the susceptor 110 is suspended. Then, when the susceptor temperature has become no greater than (predetermined heating target temperature−Δ), the switch $Q_1$ turns ON again and the susceptor 110 is reheated using the first circuit. If Δ is a value greater than "0", hysteresis can be added to the heating control. More specifically, the value of Δ is a maximum of approximately 5° C.

Although embodiments of the present disclosure have been described thus far, these are merely examples, and should be understood as not limiting the scope of the present disclosure. It should be understood that changes, additions, improvements, and so on can be made to the embodiments as appropriate without departing from the essential spirit and scope of the present disclosure. The scope of the present disclosure is not intended to be limited by any of the foregoing embodiments, and is to be defined only by the scope of patent claims and their equivalents.

Although the foregoing embodiments described control using the resonance frequency $f_0$ of the RLC series circuit, product tolerances are present in the elements constituting RLC circuits, and it is therefore not necessary to strictly use the resonance frequency $f_0$. For example, there may be a deviation of approximately +5% from the resonance frequency $f_0$ calculated from the actual parameters of the elements constituting the RLC series circuit.

Although the foregoing embodiments described sensing suction by the user based on a change in the impedance, suction by the user may instead be sensed using a suction sensor, which is not shown in FIG. 2.

In the foregoing embodiments, the control unit 118 detects the aerosol forming body 108 based on the susceptor 110, but the aerosol forming body 108 may be detected based on a marker, an RFID, or the like provided in the aerosol forming body 108 instead. It is clear that such a marker, RFID, or the like constitutes at least part of the aerosol forming body 108.

A first variation on the foregoing embodiments will be described hereinafter.

According to a first variation on the embodiments, an aerosol-generating apparatus for inductively heating a susceptor of an aerosol-forming body that includes the susceptor and an aerosol source, the aerosol-generating apparatus comprising: a housing into which the aerosol-forming body can be inserted. The housing comprises: a power supply; an alternating current generation circuit for generating an alternating current from a power supplied from the power supply; an inductive heating circuit for inductively heating the susceptor; and a control unit configured to detect a voltage and a current of a circuit including the inductive heating circuit to which the alternating current generated by the alternating current generation circuit is supplied, and in a case where, based on an impedance obtained from the detected voltage and the current, it is determined that the susceptor is not within the housing of the aerosol-generating apparatus while executing the inductive heating by supplying the alternating current to the inductive heating circuit, stop the supply of the alternating current for executing the inductive heating.

Additionally, according to the first variation on the embodiments, the control unit is further configured to notify an error in the case where, based on the impedance obtained from the detected voltage and the current, it is determined that the susceptor is not within the housing of the aerosol-generating apparatus while executing the inductive heating.

Additionally, according to the first variation on the embodiments, the control unit is further configured to notify an error concurrently to stoppage or after stoppage of the supply of the alternating current for executing the inductive heating.

Additionally, according to the first variation on the embodiments, the control unit is further configured to control the inductive heating in accordance with a heating profile by which at least a heating target temperature according to an elapsation of time is defined.

Additionally, according to the first variation on the embodiments, the control unit is further configured to stop the supply of the alternating current for executing the inductive heating after notifying the error.

Additionally, according to the first variation on the embodiments, the control unit is further configured to not stop the supply of the alternating current for executing the inductive heating in a case where, based on an impedance obtained from the voltage and the current detected before stoppage of the supply of the alternating current for executing the inductive heating, it is determined that the susceptor is within the housing of the aerosol-generating apparatus.

Additionally, according to the first variation on the embodiments, the control unit is further configured to control the inductive heating in accordance with a heating profile by which at least a heating target temperature according to an elapsation of time is defined, and a duration, until a state in which it is determined that the susceptor is in the housing of the aerosol-generating apparatus is entered from a state in which, based on an impedance obtained from the detected voltage and current, it is determined that the susceptor is not in the housing of the aerosol-generating apparatus, does not affect an overall length of the heating profile.

Additionally, according to the first variation on the embodiments, the control unit is further configured to control the inductive heating in accordance with a heating profile by which at least a heating target temperature according to an elapsation of time is defined, and extend a length of the heating profile based on a duration until a state in which it is determined that the susceptor is in the housing of the aerosol-generating apparatus is entered from a state in which, based on an impedance obtained from the detected voltage and current, it is determined that the susceptor is not in the housing of the aerosol-generating apparatus.

Additionally, according to the first variation on the embodiments, the control unit is further configured to set a number of aerosol-forming bodies that can be used in the aerosol-generating apparatus, and reduce by one the set number after stopping the supply of the alternating current for the inductive heating based on an impedance obtained from the detected voltage and the current while executing the inductive heating.

Additionally, according to the first variation on the embodiments, the control unit is further configured to continue, without stopping, the supply of the alternating current for executing the inductive heating and not reduce the set number in a case where it is determined that a state in which it is determined that the susceptor is in the housing of the aerosol-generating apparatus is entered from a state in which, based on an impedance obtained from the detected voltage and current, it is determined that the susceptor is not in the housing of the aerosol-generating apparatus.

Additionally, according to the first variation on the embodiments, the control unit is further configured to obtain a temperature of the susceptor based on an impedance of a circuit including the inductive heating circuit to which the alternating current that the alternating current generation circuit generated is supplied, and control the inductive heating based on the obtained temperature.

Additionally, according to the first variation on the embodiments, the control unit is further configured to, based on a comparison of an impedance obtained from the detected voltage and current and a predetermined value, determine whether or not to stop the supply of the alternating current for executing the inductive heating.

Additionally, according to the first variation on the embodiments, a method of operating an aerosol-generating apparatus for inductively heating a susceptor of an aerosol-forming body that includes the susceptor and an aerosol source. The aerosol-generating apparatus comprises a housing into which the aerosol-forming body can be inserted. The housing comprises: a power supply; an alternating current generation circuit for generating an alternating current from a power supplied from the power supply; and an inductive heating circuit for inductively heating the susceptor. The method comprising: a step of detecting a voltage and a current of a circuit including the inductive heating circuit to which the alternating current generated by the alternating current generation circuit is supplied, and a step of, in a case where, based on an impedance obtained from the detected voltage and the current, it is determined that the susceptor is not within the housing of the aerosol-generating apparatus while executing the inductive heating by supplying the alternating current to the inductive heating circuit, stopping the supply of the alternating current for executing the inductive heating.

Additionally, according to the first variation on the embodiments, the method further comprises a step of notifying an error in the case where, based on an impedance obtained from the detected voltage and the current, it is determined that the susceptor is not within the housing of the aerosol-generating apparatus while executing the inductive heating.

Additionally, according to the first variation on the embodiments, the method further comprises a step of controlling the inductive heating in accordance with a heating profile by which at least a heating target temperature according to an elapsation of time is defined.

Additionally, according to the first variation on the embodiments, the method further comprises: a step of, after notification of the error, stopping the supply of the alternating current for executing the inductive heating, and after notification of the error and before stoppage of the supply of the alternating current for executing the inductive heating, not stopping the supply of the alternating current for executing the inductive heating in a case where, based on a value of the detected impedance, it is determined that the susceptor is within the housing of the aerosol-generating apparatus; and a step of executing inductive heating in accordance with a heating profile by which at least a heating target temperature according to an elapsation of time is defined, and controlling: so that a duration, until a state in which it is determined that the susceptor is in the housing of the aerosol-generating apparatus is entered from a state in which, based on an impedance obtained from the detected voltage and current, it is determined that the susceptor is not in the housing of the aerosol-generating apparatus, does not affect an overall length of the heating profile, or to extend a length of the heating profile based on a duration until a state in which it is determined that the susceptor is in the housing of the aerosol-generating apparatus is entered from a state in which, based on an impedance obtained from the detected voltage and current, it is determined that the susceptor is not in the housing of the aerosol-generating apparatus.

Additionally, according to the first variation on the embodiments, the method further comprises: a step of setting a number of aerosol-forming bodies that can be used in the aerosol-generating apparatus, and a step of controlling to reduce by one the set number after stopping the supply of the alternating current for the inductive heating based on an impedance obtained from the detected voltage and the current while executing the inductive heating, or to continue, without stopping, the supply of the alternating current for executing the inductive heating and not reduce the set number in a case where it is determined that a state in which it is determined that the susceptor is in the housing of the aerosol-generating apparatus is entered from a state in which, based on an impedance obtained from the detected voltage and current, it is determined that the susceptor is not in the housing of the aerosol-generating apparatus.

Additionally, according to the first variation on the embodiments, an aerosol-generating apparatus for inductively heating a susceptor of an aerosol-forming body that includes the susceptor and an aerosol source, the aerosol-generating apparatus comprising: the aerosol-forming body; and a housing into which the aerosol-forming body can be inserted. The housing comprising: a power supply; an alternating current generation circuit for generating an alternating current from a power supplied from the power supply; an inductive heating circuit for inductively heating the susceptor; a circuit for detecting the presence or absence of the susceptor; and a control unit configured to detect a voltage and a current of a circuit including the inductive heating circuit to which the alternating current generated by the alternating current generation circuit is supplied, and in a case where, based on the impedance obtained from the detected voltage and the current, it is determined that the susceptor is not within the housing of the aerosol-generating apparatus while executing the inductive heating by supplying the alternating current to the inductive heating circuit, stop the supply of the alternating current for executing the inductive heating.

Additionally, according to the first variation on the embodiments, the control unit is further configured to notify an error in the case where, based on the impedance obtained from the detected voltage and the current, it is determined that the susceptor is not within the housing of the aerosol-generating apparatus while executing the inductive heating.

A second variation on the foregoing embodiments will be described hereinafter.

According to the second variation on the embodiments, an inductive heating apparatus configured to inductively heat a susceptor of an aerosol-forming body that includes the susceptor and an aerosol source, the inductive heating apparatus comprising: a power supply; an inductive heating circuit for inductively heating the susceptor; an alternating current generation circuit for generating an alternating current from a power supplied from the power supply, wherein the alternating current is supplied to the inductive heating circuit; and a control unit configured to, in a case where the susceptor is not detected while the inductive heating is being executed, stop the inductive heating and/or notify an error.

Additionally, according to the second variation on the embodiments, the case where the susceptor is not detected includes the case of where the susceptor ceases to be detected.

Additionally, according to the second variation on the embodiments, the case where the susceptor is not detected includes not detecting the susceptor based on an impedance of a circuit including the inductive heating circuit.

Additionally, according to the second variation on the embodiments, the inductive heating apparatus further comprises a determination unit configured to determine the impedance of the circuit including the inductive heating circuit.

Additionally, according to the second variation on the embodiment, the control unit is configured to stop the inductive heating and/or notify an error while the inductive heating is being executed.

Additionally, according to the second variation on the embodiments, to stop the inductive heating includes to stop a supply of an alternating current to the inductive heating circuit.

Additionally, according to the second variation on the embodiments, the apparatus contains a detection unit configured to detect a voltage and a current of said circuit including the inductive heating circuit, and wherein the control unit is configured to obtain the impedance of the circuit including the inductive heating circuit based on the detected voltage and current.

Additionally, according to the second variation on the embodiments, the inductive heating apparatus including a detection unit configured to detect a voltage and a current, wherein the detection unit preferably includes a voltage detection circuit and a current detection circuit.

Additionally, according to the second variation on the embodiments, the current detection circuit is configured to detect a current flowing to a coil included in the inductive heating circuit.

Additionally, according to the second variation on the embodiments, the voltage detection circuit is configured to detect a voltage provided by the power supply.

Additionally, according to the second variation on the embodiments, the case where the susceptor is not detected includes the control unit being configured to detect that the susceptor is not inserted in the inductive heating apparatus based on the impedance.

Additionally, according to the second variation on the embodiments, the susceptor is included in the aerosol-forming body, wherein the inductive heating apparatus includes a housing and wherein the case where the susceptor is not detected includes the control unit being configured to detect that the aerosol forming body is not inserted in the housing based on the impedance.

Additionally, according to the second variation on the embodiments, the control unit is further configured to notify an error concurrently to stoppage or after stoppage of the supply of the alternating current for executing the inductive heating.

Additionally, according to the second variation on the embodiments, the control unit is further configured to stop the supply of the alternating current for executing the inductive heating after notifying the error.

Additionally, according to the second variation on the embodiments, the control unit is further configured to not stop the supply of the alternating current for executing the inductive heating in a case where, based on an impedance obtained from a voltage and a current detected before stoppage of the supply of the alternating current for executing the inductive heating, it is determined that the susceptor is within the inductive heating apparatus.

Additionally, according to the second variation on the embodiments, the control unit is further configured to control the inductive heating in accordance with a heating profile by which at least a heating target temperature according to an elapsation of time is defined, and extend a length of the heating profile based on a duration until a state in which it is determined that the susceptor is in the inductive heating apparatus is entered from a state in which, based on an impedance obtained from a detected voltage and current, it is determined that the susceptor is not in the inductive heating apparatus.

Additionally, according to the second variation on the embodiment, the control unit is further configured to set a number of aerosol-forming bodies that can be used in the inductive heating apparatus, and reduce by one the set number, in a case where, based on an impedance obtained from a detected voltage and current, it is determined that the susceptor is not within the inductive heating apparatus while executing the inductive heating by supplying the alternating current to the inductive heating circuit.

Additionally, according to the second variation on the embodiments, the control unit is further configured to continue, without stopping, the supply of the alternating current for executing the inductive heating and not reduce the set number in a case where it is determined that a state in which it is determined that the susceptor is in the inductive heating apparatus is entered from a state in which, based on an impedance obtained from the detected voltage and current, it is determined that the susceptor is not in the inductive heating apparatus.

Additionally, according to the second variation on the embodiments, the control unit is further configured to obtain a temperature of the susceptor based on an impedance of a circuit including the inductive heating circuit to which the alternating current that the alternating current generation circuit generated is supplied, and control the inductive heating based on the obtained temperature.

Additionally, according to the second variation on the embodiments, the control unit is further configured to, based on a comparison of an impedance obtained from the detected voltage and current and a predetermined value, determine whether or not to stop the supply of the alternating current for executing the inductive heating.

Additionally, according to the second variation on the embodiments, the control unit is further configured to, in a case where the susceptor is detected again before a predetermined period of time has elapsed from stoppage of the inductive heating, resume the inductive heating.

Additionally, according to the second variation on the embodiments, the control unit is configured to control the inductive heating such that the inductive heating follows a heating profile by which at least a heating target temperature according to an elapsation of time is defined.

Additionally, according to a second variation on the embodiments, the time from stoppage of the inductive heating until resumption of the inductive heating is treated as the elapsation of time.

Additionally, according to the second variation on the embodiments, the control unit is configured to control the inductive heating such that the inductive heating follows a heating profile for which a heating target temperature according to an elapsation of time at least is specified, and the time from stoppage of the inductive heating until resumption of the inductive heating is not treated as the elapsation of time.

Additionally, according to the second variation on the embodiments, the control unit is further configured to, after notifying the error, stop the inductive heating.

Additionally, according to the second variation on the embodiments, the control unit is configured to, in a case where after notifying the error and before stopping the inductive heating, the susceptor is detected again, not stop the inductive heating.

Additionally, according to the second variation on the embodiments, the inductive heating follows a heating profile for which a heating target temperature according to an elapsation of time at least is specified, and the control unit is configured such that a period from when the susceptor ceases to be detected to when the susceptor is detected again does not affect an overall length of the heating profile.

Additionally, according to the second variation on the embodiments, the inductive heating follows a heating profile for which a heating target temperature according to an elapsation of time at least is specified, and the control unit is configured such that based on a period from when the susceptor ceases to be detected to when the susceptor is detected again, the length of the heating profile is extended.

Additionally, according to the second variation on the embodiments, a method of operating an inductive heating apparatus configured to inductively heat a susceptor of an aerosol-forming body that includes the susceptor and an aerosol source. The inductive heating apparatus comprises a power supply; an inductive heating circuit for inductively heating the susceptor; an alternating current generation circuit for generating an alternating current from a power supplied from the power supply, wherein the alternating current is supplied to the inductive heating circuit; and a control unit. The method comprises stopping the inductive heating and/or notifying an error, in a case where the susceptor is not detected while the inductive heating is being executed.

In addition, according to the second variation on the embodiments, a computer program including instructions that, when the computer program is executed by a computer, causes the computer to function as the inductive heating apparatus according to the foregoing second variation on the embodiments, and a computer-readable storage medium on which is stored that computer program, are provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An aerosol-generating apparatus for inductively heating a susceptor of an aerosol-forming body that includes the susceptor and an aerosol source, the aerosol-generating apparatus comprising:

a housing into which the aerosol-forming body can be inserted, wherein the housing comprises:

a power supply;

an alternating current generation circuit for generating an alternating current from a power supplied from the power supply;

an inductive heating circuit for inductively heating the susceptor;

a detection circuit including a circuit for detecting each of a voltage and a current of a circuit including the inductive heating circuit to which the alternating current generated by the alternating current generation circuit is supplied;

a controller configured to start the inductive heating in a case where it is determined that at least a part of the aerosol-forming body is inserted into the housing of the aerosol-generating apparatus based on a value obtained from the detection circuit; and a voltage adjustment circuit connected to the power supply and the controller, wherein the current is detected at a position on a path between the power supply and the alternating current generation circuit that is closer to the alternating current generation circuit than a branching point from the path to the voltage adjustment circuit.

2. The aerosol-generating apparatus according to claim 1, wherein the voltage is detected on the path between the power supply and the alternating current generation circuit.

3. The aerosol-generating apparatus according to claim 1, wherein the housing further comprises:

a remaining amount measurement IC configured to measure a remaining amount of the power supply, and wherein the remaining amount measurement IC is not included in the detection circuit.

4. The aerosol-generating apparatus according to claim 1, wherein the housing further comprises:

a charging circuit connected to the power supply, wherein the current is detected at a position on the path between the power supply and the alternating current generation circuit that is closer to the alternating current generation circuit than a branching point from the path to the charging circuit.

5. The aerosol-generating apparatus according to claim 1, wherein the controller is further configured to:

obtain a temperature of the susceptor based on the value obtained from the detection circuit, and control the inductive heating based on the obtained temperature.

6. The aerosol-generating apparatus according to claim 1, wherein the controller is further configured to:

detect whether or not the at least a part of the aerosol-forming body is inserted into the housing of the aerosol-generating apparatus, at a first mode, detect whether or not the at least a part of the aerosol-forming body is inserted into the housing of the aerosol-generating apparatus, and at a second mode different from the first mode, not detect whether or not at least a part of the aerosol-forming body is inserted into the housing of the aerosol-generating apparatus.

7. The aerosol-generating apparatus according to claim 6, further comprising:

a connection unit configured to enable connection with a charging power source, wherein the controller is further configured to execute processing of the first mode until a predetermined period of time has passed after detecting removal of the charging power source from the connection unit.

8. The aerosol-generating apparatus according to claim 6, further comprising:

a user interface, wherein the controller is further configured to transition to the first mode in response to a predetermined operation being performed at the user interface.

9. The aerosol-generating apparatus according to claim 6, further comprising:

a user interface, wherein the controller is further configured to return to the first mode from the second mode in response to a predetermined operation being performed at the user interface after transitioning to the second mode in response to a predetermined period of time passing after transitioning to the first mode.

10. The aerosol-generating apparatus according to claim 1, further comprising:

a connection unit configured to enable connection with a charging power source, wherein the controller is further configured to, while a connection of the charging power source to the connection unit is being detected, not measure the voltage and the current of the circuit to which alternating current generated by the alternating current generation circuit is supplied.

11. The aerosol-generating apparatus according to claim 1, wherein the controller is further configured to measure the voltage and the current of the circuit at a resonance frequency of the circuit to which the alternating current generated by the alternating current generation circuit is supplied.

12. A method for operating an aerosol-generating apparatus for inductively heating a susceptor of an aerosol-forming body that includes the susceptor and an aerosol source, wherein the aerosol-generating apparatus comprises:

a housing into which the aerosol-forming body can be inserted, wherein the housing comprises:

a power supply;

an alternating current generation circuit for generating an alternating current from a power supplied from the power supply;

an inductive heating circuit for inductively heating the susceptor;

a detection circuit including a circuit for detecting each of a voltage and a current of a circuit including the inductive heating circuit to which the alternating current generated by the alternating current generation circuit is supplied;

a controller; and a voltage adjustment circuit connected to the power supply and the controller, the method comprising:

starting the inductive heating in a case where it is determined that at least a part of the aerosol-forming body is inserted into the housing of the aerosol-generating apparatus based on a value obtained from the detection circuit, wherein the current is detected at a position on a path between the power supply and the alternating current generation circuit that is closer to the alternating current generation circuit than a branching point from the path to the voltage adjustment circuit.

13. The method according to claim 12, wherein the voltage is detected on a path between the power supply and the alternating current generation circuit.

14. The method according to claim 12, wherein the housing further comprises a remaining amount measurement IC configured to measure a remaining amount of the power supply, and wherein the remaining amount measurement IC is not included in the detection circuit.

15. The method according to claim 12, wherein the housing further comprises a charging circuit connected to the power supply, and wherein the current is detected at a position on the path between the power supply and the alternating current generation circuit that is closer to the alternating current generation circuit than a branching point from the path to the charging circuit.

16. The method according to claim 12, wherein the controller further is configured to detect whether or not the at least a part of the aerosol-forming body is inserted into the housing of the aerosol-generating apparatus, the method further comprising at least one of:

switching between a first mode in which detection of whether or not the at least a part of the aerosol forming body is inserted into the housing of the aerosol-generating apparatus is performed and a second mode in which detection of whether or not the at least a part of the aerosol forming body is inserted into the housing of the aerosol-generating apparatus is not performed;

and measuring the voltage and the current of the circuit at a resonance frequency of the circuit to which the alternating current generated by the alternating current generation circuit is supplied.

17. An aerosol-generating apparatus for inductively heating a susceptor of an aerosol-forming body that includes the susceptor and an aerosol source, the aerosol-generating apparatus comprising:

the aerosol-forming body;

a housing into which the aerosol-forming body can be inserted, wherein the housing comprises:

a power supply;

an alternating current generation circuit for generating an alternating current from a power supplied from the power supply;

an inductive heating circuit for inductively heating the susceptor;

a detection circuit including a circuit for detecting each of a voltage and a current of a circuit including the inductive heating circuit to which the alternating current generated by the alternating current generation circuit is supplied;

a controller configured to start the inductive heating in a case where it is determined that at least a part of the aerosol-forming body is inserted into the housing of the aerosol-generating apparatus based on a value obtained from the detection circuit; and a voltage adjustment circuit connected to the power supply and the controller, wherein the current is detected at a position on a path between the power supply and the alternating current generation circuit that is closer to the alternating current generation circuit than a branching point from the path to the voltage adjustment circuit.

18. The aerosol-generating apparatus according to claim 17, wherein the voltage is detected on a path between the power supply and the alternating current generation circuit.

19. The aerosol-generating apparatus according to claim 17, wherein the housing further comprises:

a remaining amount measurement IC configured to measure a remaining amount of the power supply, and wherein the remaining amount measurement IC is not included in the detection circuit.

20. The aerosol-generating apparatus according to claim 17, wherein the housing further comprises:

a charging circuit connected to the power supply, wherein the current is detected at a position on the path between the power supply and the alternating current generation circuit that is closer to the alternating current generation circuit than a branching point from the path to the charging circuit.

21. The method according to claim 16, wherein the control unit executes any one of the following:

executing processing of the first mode until a predetermined period of time has passed after detecting removal of a charging power source from a connector of the aerosol-generating apparatus, the connector being configured to enable connection with the charging power source; and transitioning to the first mode from the second mode, by the controller, in response to a predetermined operation being performed at a user interface of the aerosol-generating apparatus.

* * * * *